US010842161B2

(12) United States Patent
Luther et al.

(10) Patent No.: US 10,842,161 B2
(45) Date of Patent: Nov. 24, 2020

(54) SMOKING ARTICLE AND METHOD

(71) Applicants: Robert Luther, Chester, CT (US);
Michael Luther, Chester, CT (US);
Arnold Tang, Aloha, OR (US)

(72) Inventors: Robert Luther, Chester, CT (US);
Michael Luther, Chester, CT (US);
Arnold Tang, Aloha, OR (US)

( * ) Notice: Subject to any disclaimer, the term of this patent is extended or adjusted under 35 U.S.C. 154(b) by 851 days.

(21) Appl. No.: 14/445,656

(22) Filed: Jul. 29, 2014

(65) Prior Publication Data

US 2015/0030736 A1    Jan. 29, 2015

Related U.S. Application Data

(60) Provisional application No. 61/859,698, filed on Jul. 29, 2013.

(51) Int. Cl.
*A23B 4/052*     (2006.01)
*A47J 37/07*     (2006.01)
(Continued)

(52) U.S. Cl.
CPC .......... *A23B 4/0523* (2013.01); *A47J 37/079* (2013.01); *A47J 37/0736* (2013.01); *F23Q 7/02* (2013.01); *F23Q 13/00* (2013.01); *A47J 37/0731* (2013.01)

(58) Field of Classification Search
CPC ... A23B 4/0523; A47J 37/079; A47J 37/0731; A47J 37/0736; A47J 2037/0795;
(Continued)

(56) References Cited

U.S. PATENT DOCUMENTS 1,328,183 A    1/1920  MLekush
2,920,243 A *  1/1960  Taren .................... A47J 37/079
                                                   126/25 B
(Continued)

FOREIGN PATENT DOCUMENTS

EP    0290381 A2 * 11/1988 ............. A23B 4/052
EP    0373496 A1 *  6/1990 ............. A23B 4/052
JP    02279916 A  * 11/1990 ............. A47J 37/079

OTHER PUBLICATIONS

"Definition—Chamber.pdf", The New Lexicon Webster's Encyclopedic Dictionary of the English Language, Deluxe Edition, Lexicon Publications, p. 162, 1990.*

*Primary Examiner* — Gregory L Huson
*Assistant Examiner* — Daniel E Namay
(74) *Attorney, Agent, or Firm* — Steven M. McHugh

(57) ABSTRACT

A meat smoker/cooker device is provided and includes a fuel chamber having a fuel chamber structure which includes a fuel chamber sidewall that defines a fuel chamber cavity, wherein the fuel chamber sidewall includes a first mounting hole, a second mounting hole and a sidewall slot communicated with the chamber cavity. Additionally, the meat smoker device also includes a fuel container having a container rim and being located within the chamber cavity proximate the slot bottom and an ignition article having an ignition article handle, an ignition article mounting structure and a heating element, wherein the ignition article handle includes a handle portion movably located within the sidewall slot and wherein the ignition article mounting structure is configured to mountingly engage with the first and second mounting hole, such that the ignition article is configurable between a first and second configuration.

20 Claims, 46 Drawing Sheets

(51) Int. Cl.
*F23Q 7/02* (2006.01)
*F23Q 13/00* (2006.01)
*F23Q 13/04* (2006.01)

(58) Field of Classification Search
CPC .......... A47J 37/07; F23Q 13/04; F23Q 13/00; F23Q 7/02
USPC .......... 16/25 B, 25 A, 154; 126/25 B, 25 A, 126/154, 275 R, 59, 25 AA; 99/421 HV
IPC .......... A23B 4/052; A47J 37/07; F23Q 13/04, 13/00, 7/02
See application file for complete search history.

(56) References Cited

U.S. PATENT DOCUMENTS

| | | | |
|---|---|---|---|
| 2,938,988 A | | 5/1960 | McCutcheon et al. |
| 3,258,003 A | * | 6/1966 | Turner .................. A01M 13/00 126/59.5 |
| 3,529,557 A | | 9/1970 | Treanor |
| 3,628,474 A | | 12/1971 | Rehwaldt |
| 3,688,758 A | * | 9/1972 | Stephen, Jr. ......... A47J 37/0713 126/25 A |
| 3,736,405 A | * | 5/1973 | Bryson, Jr. ............... F23Q 7/02 126/25 B |
| 3,776,127 A | | 12/1973 | Muse |
| 3,991,666 A | | 11/1976 | Tidwell et al. |
| 4,213,381 A | | 7/1980 | Ellis |
| 4,406,941 A | | 9/1983 | Schmerein, Jr. |
| 4,700,618 A | | 10/1987 | Cox, Jr. |
| 4,909,237 A | | 3/1990 | Karpinia |
| 5,154,159 A | * | 10/1992 | Knafelc ............... A47J 37/0754 126/154 |
| 5,730,114 A | | 3/1998 | Fabrikant et al. |
| 5,755,154 A | | 5/1998 | Schroeter et al. |
| 5,768,983 A | | 6/1998 | Treiber |
| 6,035,770 A | | 3/2000 | Whitefield |
| 7,305,982 B2 | | 12/2007 | Gross |
| 7,934,494 B1 | | 5/2011 | Schneider |
| 2004/0154603 A1 | * | 8/2004 | Crawford .............. A47J 37/079 126/25 R |
| 2006/0196368 A1 | | 9/2006 | Whitmer |
| 2008/0121632 A1 | | 5/2008 | Wang |
| 2010/0258105 A1 | | 10/2010 | Simms, II |
| 2011/0186033 A1 | * | 8/2011 | Chang ..................... A47J 37/07 126/25 B |
| 2011/0268853 A1 | | 11/2011 | Cohen |
| 2012/0073561 A1 | | 3/2012 | Gregory |
| 2013/0269675 A1 | * | 10/2013 | DeMars ............. A47J 37/0718 126/25 B |
| 2014/0038117 A1 | * | 2/2014 | Tannous ................... F23Q 7/02 431/258 |
| 2014/0216273 A1 | * | 8/2014 | Burch ....................... A23L 5/15 99/445 |
| 2014/0290497 A1 | * | 10/2014 | Blomberg ........... A47J 37/0704 99/339 |

\* cited by examiner

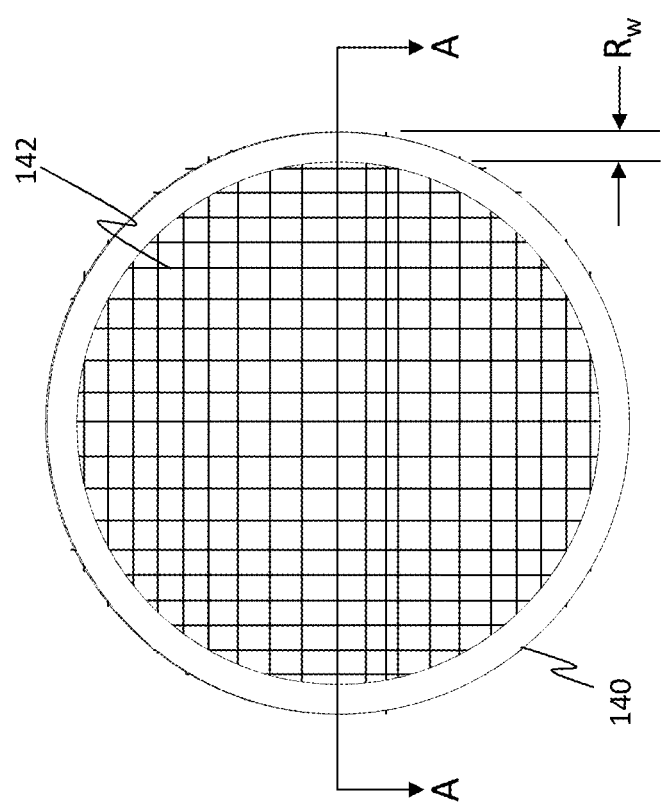
*FIG. 4A*
*FIG. 4B*
*Section A-A*

Section B-B

*Section C-C*

Chips/Coals

Chips/Coals

Section D-D

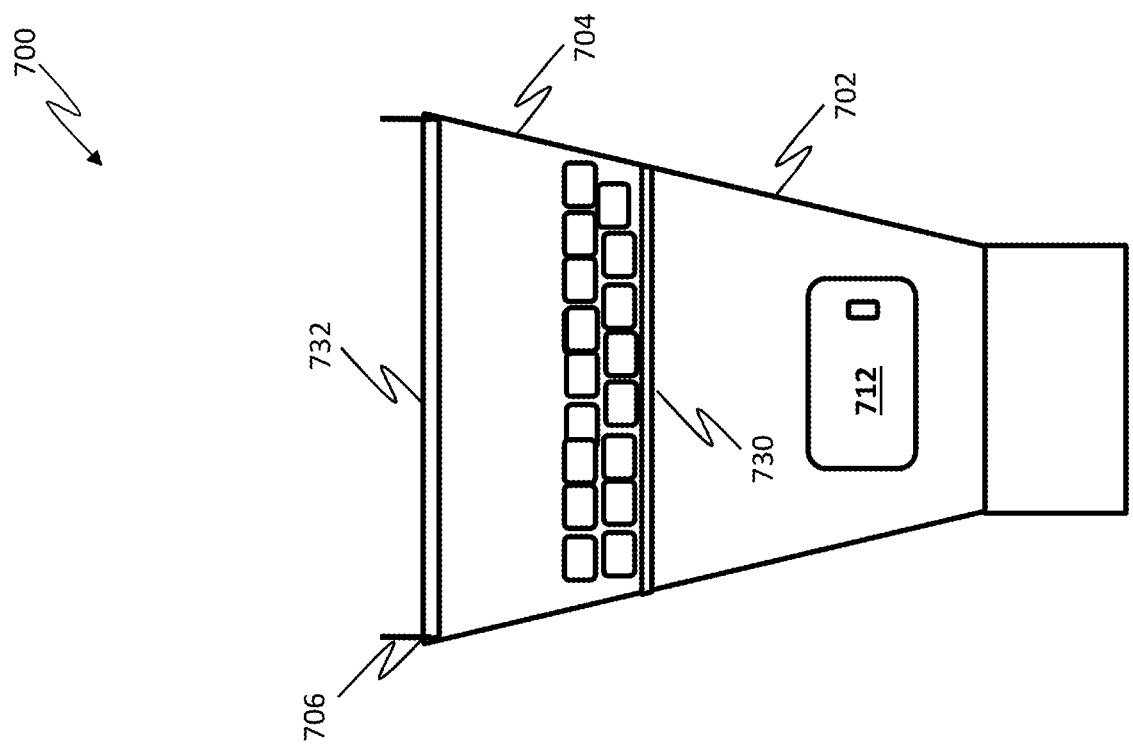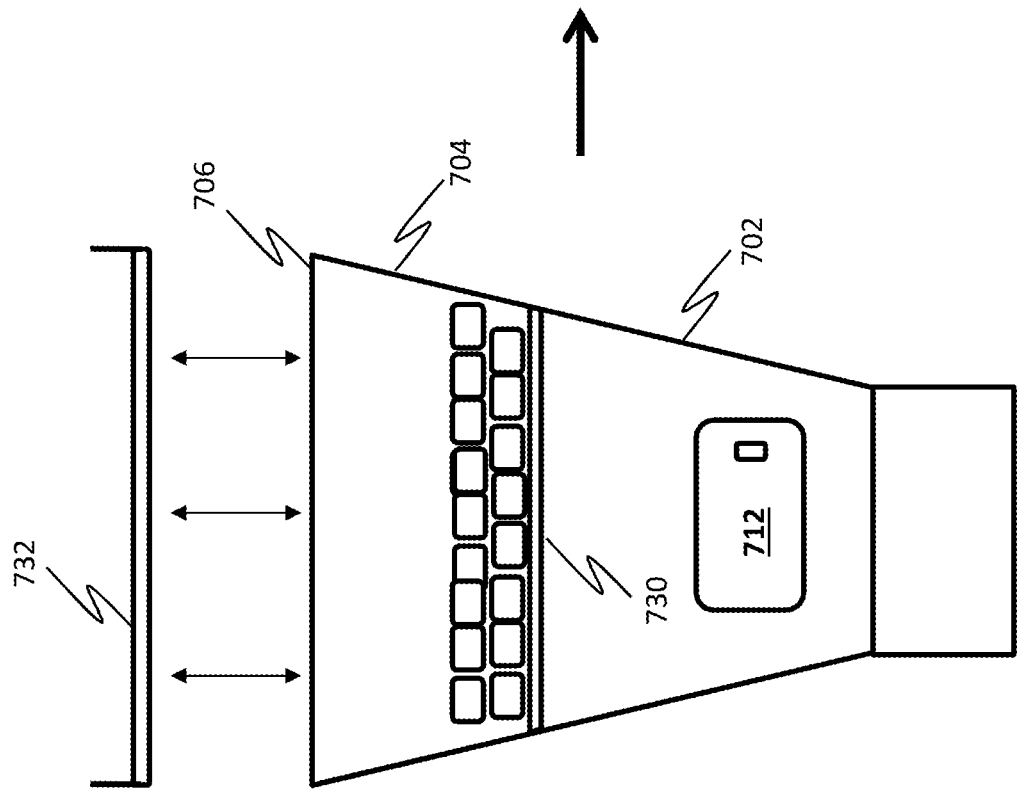
FIG. 44

SMOKING ARTICLE AND METHOD

CROSS-REFERENCE TO RELATED APPLICATIONS

The present application claims priority of the filing date of U.S. Provisional Patent Application Ser. No. 61/859,698, entitled "A Smoking Article and Method", filed on Jul. 29, 2013, the content of which is incorporated herein by reference in its entirety.

FIELD OF THE INVENTION

The present invention relates to a meat cooking/smoking article and a method for igniting/maintaining the cooking/smoking fuel and more particularly to a cooking/smoking article having an electronic heating element to ignite/maintain the cooking/smoking fuel, to control temperature throughout the cooking process and to provide surfaces for both grilling and smoking.

BACKGROUND OF THE INVENTION

Smoking meat and other food articles is well known and has been practiced for several hundred years. One of the main reasons that people began to smoke meat was due to the preservation qualities imparted by the smoking process which causes the meat to emit an acid which creates a skin on the outside of the meat and acts to prevent growth of surface mold or bacteria in the meat. This was a necessary practice because without refrigeration meat would spoil relatively quickly and smoking the meat allowed for an extended time in which the meat would be consumable. However, with the invention of other preservation methods, such as refrigeration, due to the flavor imparted to the meat via the smoking process, the smoking of meat became more of a hobby and business. Smoking meat, such as a pork shoulder or beef briskets, requires low cooking temperatures (180-250 degrees ° F.) for a long period of time (approximately 8-16 hours) in order to break down the tendons in the meat without drying it out. Cooking the meat in these controlled conditions over a coal or wood fire creates the delicious phenomenon known as bar-b-que (i.e. fork tender chunks of meat enhanced with mouth watering smoke flavor). Businesses or individuals that smoke large amounts of meat, typically employ a smokehouse, which is an enclosed building having no windows and a vent. In this case, the meat is located within the enclosure, which is then filled with smoke so that the smoke contacts the meat. However, individuals that smoke meat as a hobby typically don't need the capacity of a smokehouse or have the money to build a smokehouse.

Accordingly, there are a variety of meat smoking devices currently available to the hobbyist. Typically, these devices are portable devices that are similar in design (and in some cases may be integrated with) an ordinary gas barbecue grill. These devices have an area under the grill or a separate 'firebox' on to the side of the grill (which holds the meat) which is designed to hold a smoking source, such as wood chips or smoking coals. Once the smoking source is ignited, the cover is closed and the smoke from the burning or smoldering smoking source rises up and contacts the meat. Unfortunately however, the fire must be tended for the duration of the process which can be as much as 16 hours. Only a small percentage of the cooking population can devote this amount of time to preparing meat. Accordingly, this process is difficult and time consuming.

Currently, there are meat smoking devices that try to address this issue by using an electric heating element as the heat source, where the smoking source, such as wood chips, is added periodically to create the smoke. Unfortunately, the results from these smoking devices are inferior to a full sustained coal or wood fire which is typically a desired and essential part of the bar-b-que experience. The main reason for this is that the heat from the fire damages the outer sheath of the heating element, thereby causing the heating element to fail. This is undesirable because if the fire of the smoking source is not effectively maintained, the meat won't be sufficiently cured/cooked and may be a potential health hazard to those who ingest the uncured/uncooked meat. Thus, it is desirable to make a meat smoker having an electric heating element where the heat and fire from the smoking source is easier and more effectively maintained without causing damage to the heating element.

SUMMARY OF THE INVENTION

A meat smoker/cooker device is provided and includes a smoking/cooking chamber, wherein the smoking/cooking chamber includes a chamber structure which defines a chamber cavity and a chamber opening communicated with the chamber cavity and a chamber opening cover movably associated with the chamber structure and configurable between an open configuration and a closed configuration. The meat smoker device further includes a fuel chamber, wherein the fuel chamber includes a fuel chamber structure which includes a fuel chamber sidewall that defines a fuel chamber cavity, wherein the fuel chamber sidewall includes a first mounting hole, a second mounting hole and a sidewall slot communicated with the chamber cavity, wherein the sidewall slot includes a slot top and a slot bottom, wherein the first mounting hole is located proximate the slot top and the second mounting hole is located proximate the slot bottom. Additionally, the meat smoker device also includes a fuel container having a container rim and a fuel support structure, wherein the fuel container is located within the chamber cavity proximate the slot bottom; and an ignition article having an ignition article handle, an ignition article mounting structure and a heating element, wherein the ignition article handle includes a handle portion sized to be movably located within the sidewall slot and wherein the ignition article mounting structure is configured to mountingly engage with the first and second mounting hole, wherein the ignition article is configurable between a first configuration and a second configuration, wherein when in the first configuration, the heating element is located proximate the container rim and wherein when in the second configuration, the heating element is located remotely from the container rim.

A meat smoker/cooker device is provided and includes a fuel chamber, wherein the fuel chamber includes a fuel chamber structure which includes a fuel chamber sidewall that defines a fuel chamber cavity, wherein the fuel chamber sidewall includes a first mounting hole, a second mounting hole and a sidewall slot communicated with the chamber cavity, wherein the sidewall slot includes a slot top and a slot bottom, wherein the first mounting hole is located proximate the slot top and the second mounting hole is located proximate the slot bottom. Additionally, the meat smoker device also includes a fuel container having a container rim and a fuel support structure, wherein the fuel container is located within the chamber cavity proximate the slot bottom; and an ignition article having an ignition article handle, an ignition article mounting structure and a heating element, wherein the ignition article handle includes a handle portion sized to be movably located within the sidewall slot and wherein the ignition article mounting structure is configured to mountingly engage with the first and second mounting hole, wherein the ignition article is configurable between a first configuration and a second configuration, wherein when in the first configuration, the heating element is located proximate the container rim and wherein when in the second configuration, the heating element is located remotely from the container rim.

A method for operating a meat smoker/cooker device having a fuel chamber and an ignition article is provided, wherein the method includes locating fuel within the fuel chamber; configuring the ignition article into a first configuration such that the ignition article is located proximate the fuel, operating the ignition article to cause the fuel to ignite and burn and when the fuel is ignited and burning, configuring the ignition article into a second configuration such that the ignition article is located away from the ignited and burning fuel. Thus, the ignition article is configurable to be used as a cooking element to cook the meat and/or to ignite (and keep ignited) the fuel used to smoke the meat.

BRIEF DESCRIPTION OF THE DRAWINGS

The foregoing and other features and advantages of the present invention will be better understood from the following detailed description of illustrative embodiments, taken in conjunction with the accompanying drawings in which:

FIG. 4A is a top down view of a fuel container for the meat smoker device of FIG. 1 in accordance with a first embodiment.

FIG. 4B is a side sectional view of the fuel container of FIG. 4A.

FIG. 44 is a side sectional view of the smoking/cooking chamber of FIG. 35, showing the grilling fuel grate and the food support structure, in accordance with one embodiment of the invention.

DETAILED DESCRIPTION OF THE INVENTION

Figure 1:
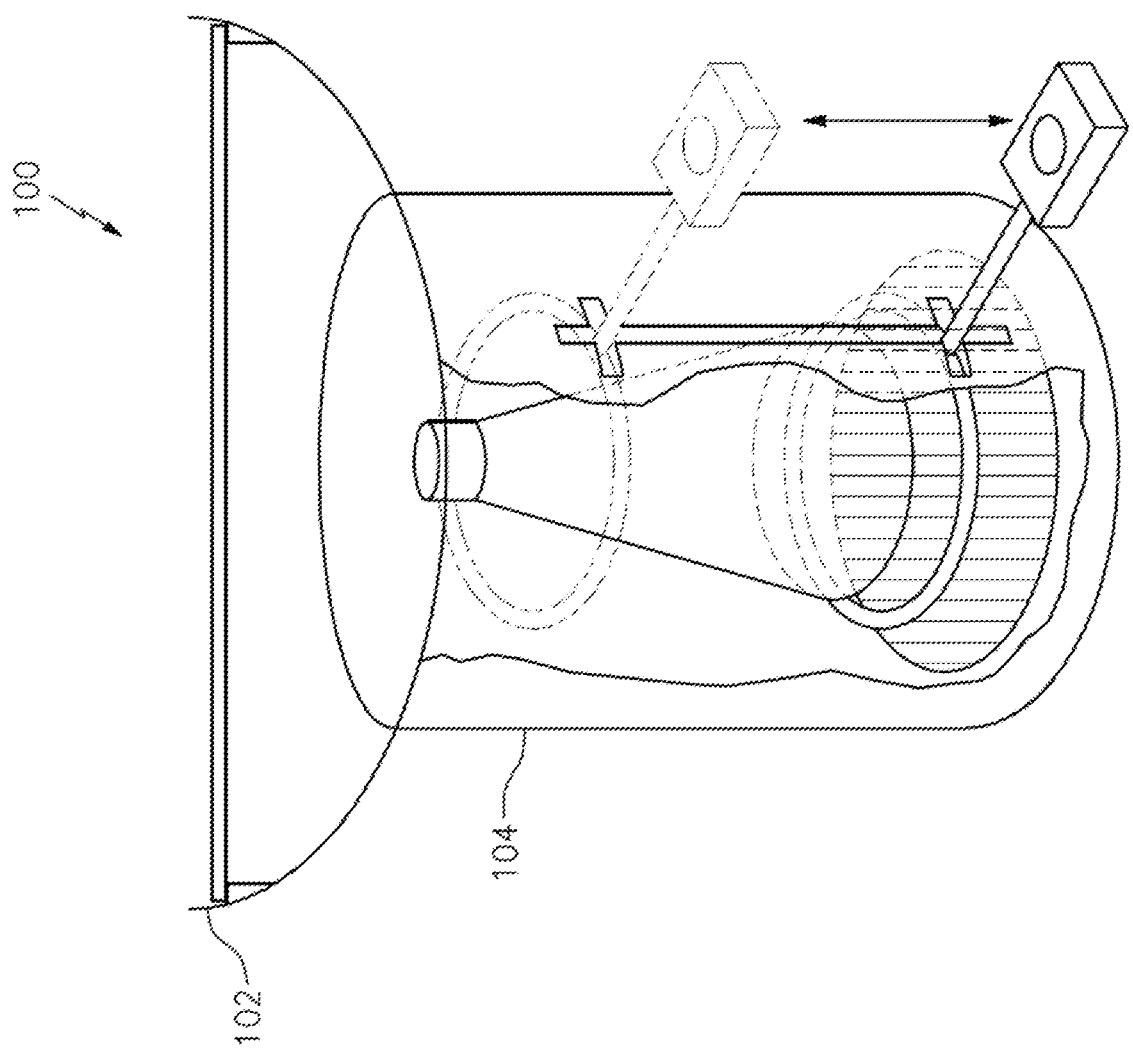
FIG. 1 is a side sectional view of a meat cooker/smoker device, in accordance with one embodiment of the present invention.
Figure 2:
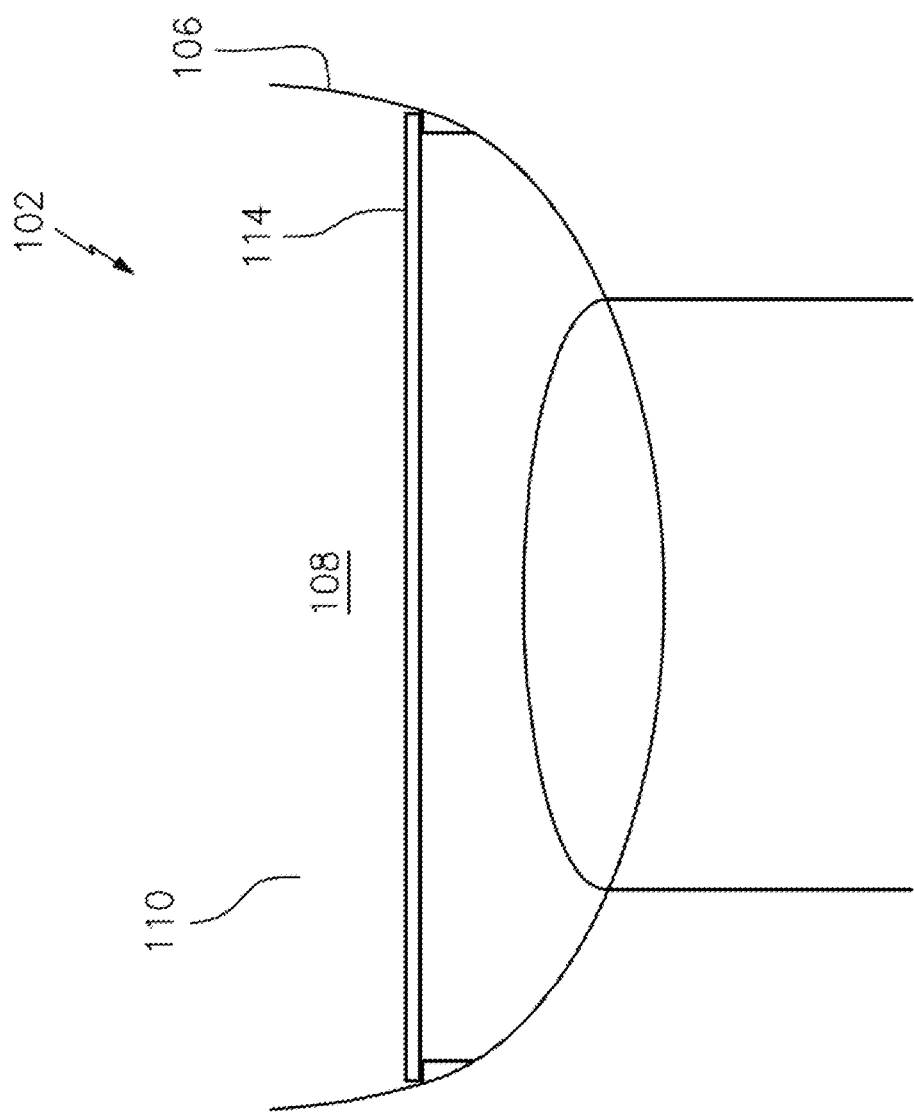
FIG. 2 is a side sectional view of the smoking/cooking chamber of the meat smoker device of FIG. 1.

Referring to FIG. 1, a meat smoker device 100 is shown and includes a cooking/smoking chamber 102 and a fuel chamber 104, in accordance with one embodiment of the invention. Referring to FIG. 2, the cooking/smoking chamber 102 includes a chamber structure 106 which defines a chamber cavity 108 for containing meat to be cooked and/or smoked. The chamber structure 106 further defines a chamber cavity opening 110 which allow access to the chamber cavity 108. The chamber structure 106 further includes a chamber cover (NOT SHOWN) which is configured to be movably associated with the chamber cavity opening 110 to allow the chamber cavity 108 to be open or enclosed. The cooking/smoking chamber 102 further includes at least one support device (i.e. grilling/smoking surface) 114 for supporting meat during the smoking and/or cooking process. The support device 114 preferably includes openings to allow smoke and heat to contact the meat contained on the support device 114.

Figure 3:
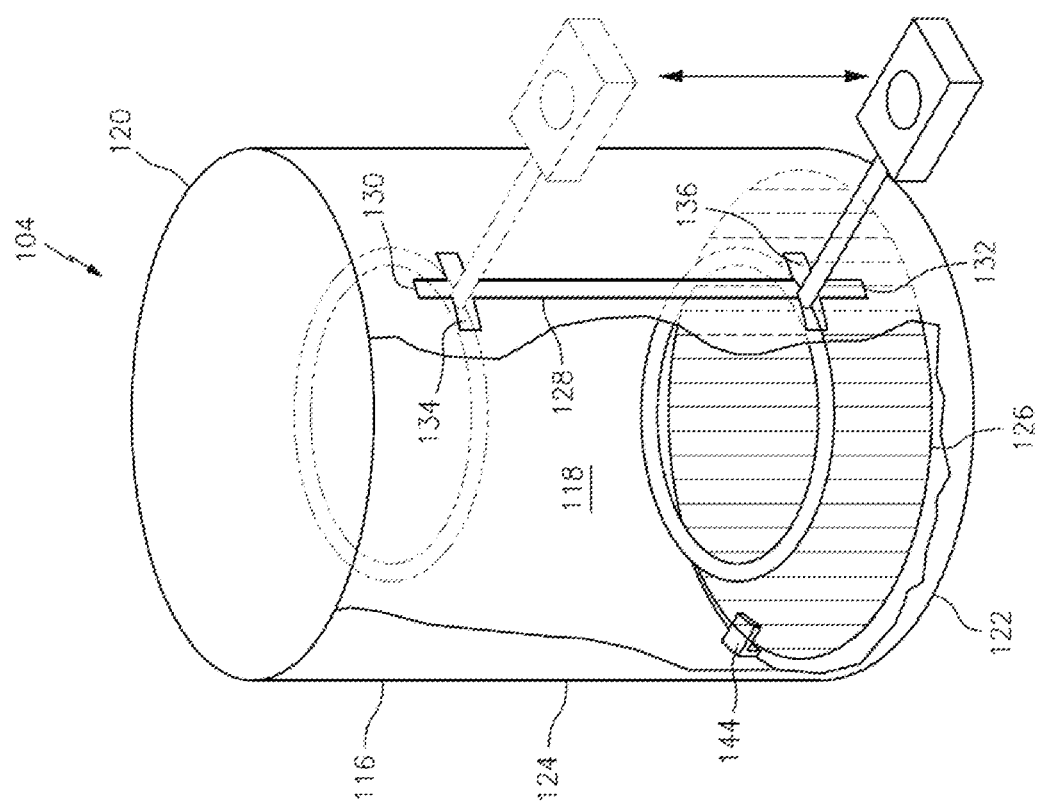
FIG. 3 is a side sectional view of the fuel chamber of the meat smoker device of FIG. 1.

Referring to FIG. 3, the fuel chamber 104 includes a fuel chamber structure 116 which defines a fuel chamber cavity 118 and includes a fuel chamber top 120, a fuel chamber bottom 122 and a fuel chamber sidewall 124. The fuel chamber 104 includes a fuel support platform 126 located proximate the fuel chamber bottom 122 for holding fuel, such as wood chips, coal, etc. The fuel chamber sidewall 124 includes a heat element slot 128 having a slot top 130 and a slot bottom 132 and extending at least partially between the fuel chamber top 120 and the fuel chamber bottom 122. Additionally, the heating element slot 128 includes at least one top mounting hole 134 located proximate the slot top 130 and at least one bottom mounting hole 136 located proximate the slot bottom 132.

Figure 5:
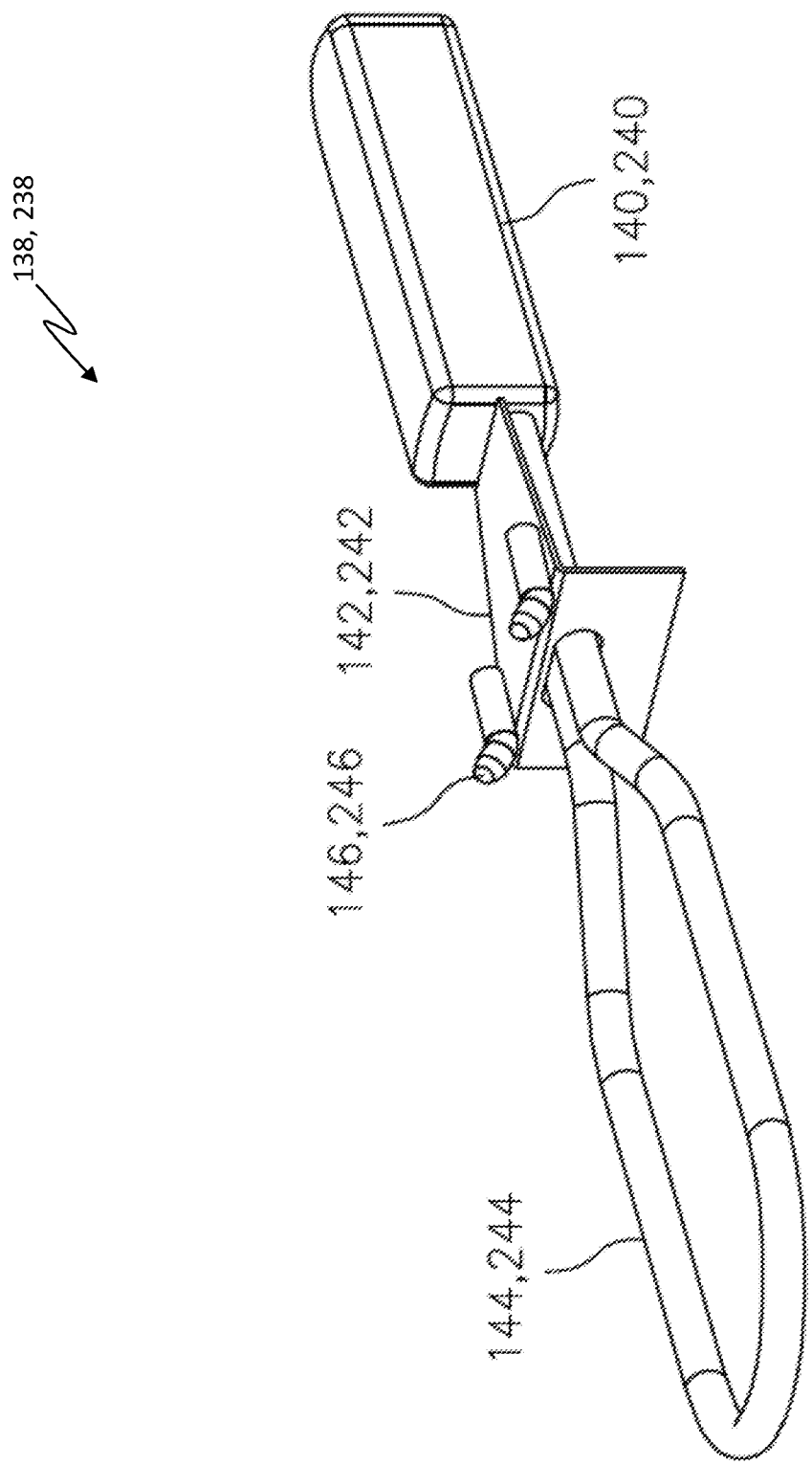
FIG. 5 is a perspective side view of an ignition article of the meat smoker device of FIG. 1, in accordance with one embodiment of the invention.

Referring to FIG. 4A and FIG. 4B, the fuel support platform 126 includes a container rim 140 and a fuel support structure 142, wherein the fuel support structure 142 is bowl/basket shaped. The container rim 140 includes a rim width $R_w$ and is substantially horizontal. The fuel chamber 104 further includes one or more mounting surfaces 139 located on the internal surface of the fuel chamber structure 116 for supporting the fuel support platform 126. Referring to FIG. 5, the meat smoker device 100 further includes an ignition article 138 having an ignition article handle 141, an ignition article mounting structure 143 and a heating element 144. It should be appreciated that the ignition article mounting structure 143 includes a pair of prongs 146 for engaging the top and bottom mounting holes 134, 136.

Figure 6:
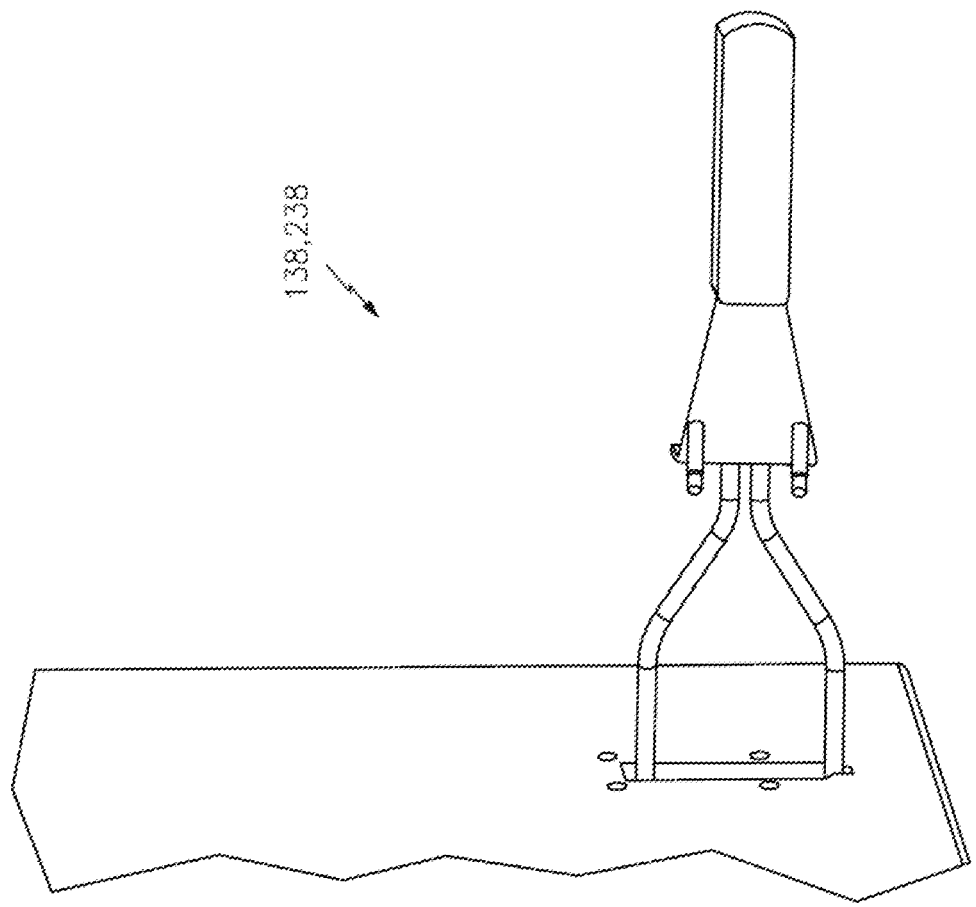
FIG. 6 is a side perspective view of the ignition article of FIG. 5 associated with the fuel chamber of FIG. 3 being configured into a first configuration, in accordance with one embodiment of the invention.
Figure 7:
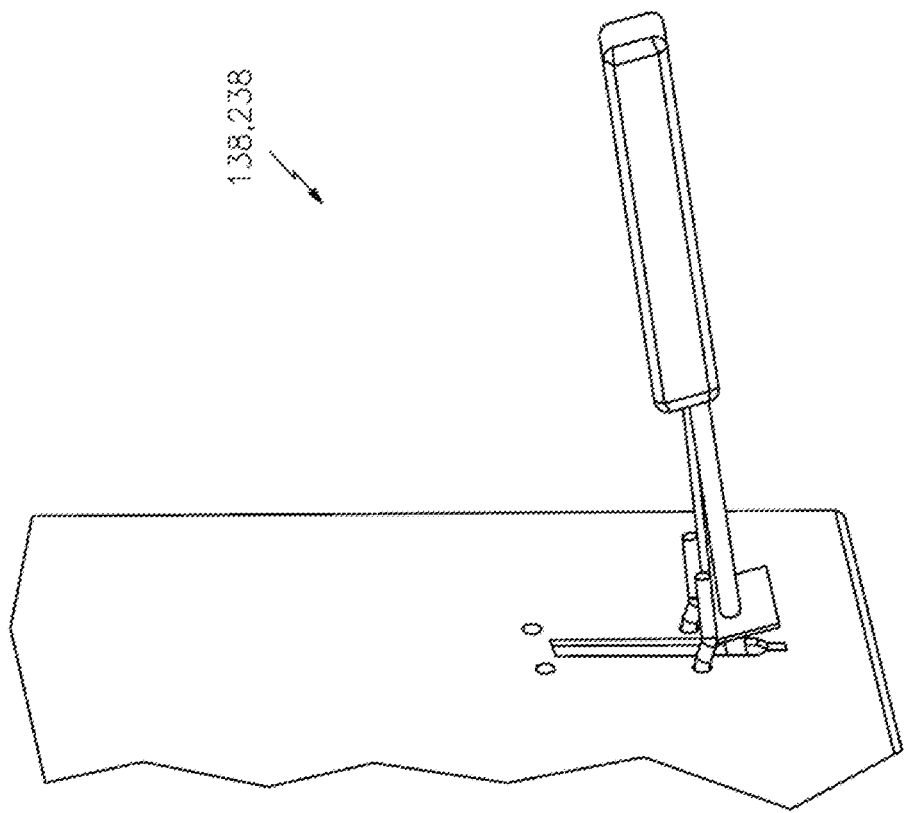
FIG. 7 is a side perspective view of the ignition article of FIG. 5 associated with the fuel chamber of FIG. 3 being configured into the first configuration, in accordance with one embodiment of the invention.
Figure 8:
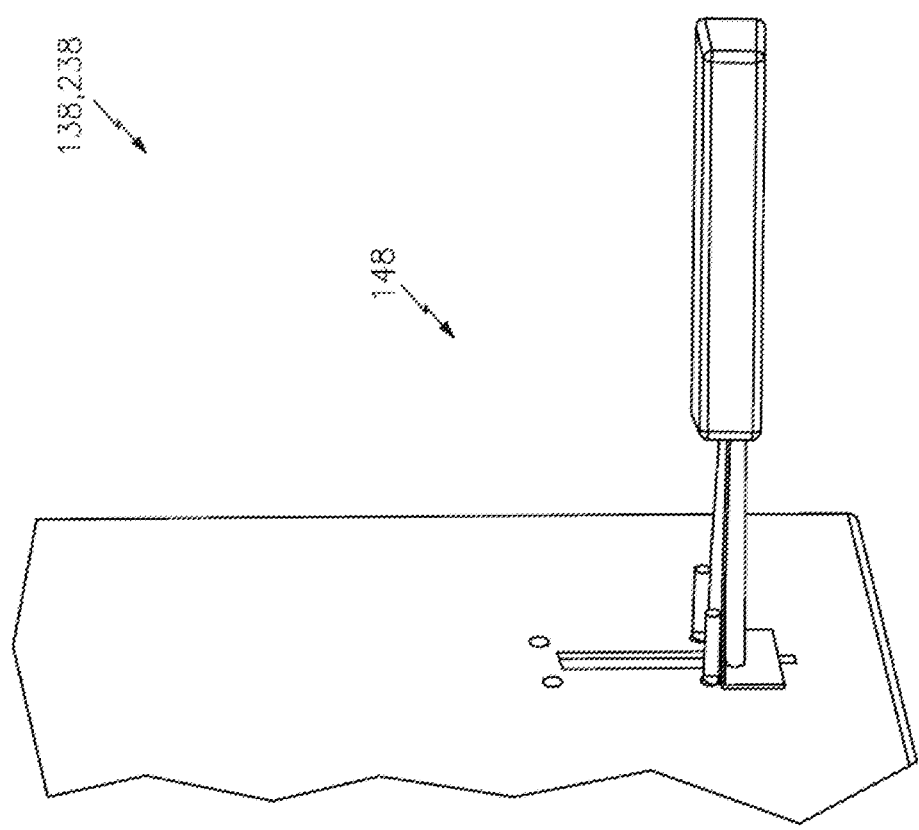
FIG. 8 is a side perspective view of the ignition article of FIG. 5 associated with the fuel chamber of FIG. 3 configured in the first configuration, in accordance with one embodiment of the invention.
Figure 9:
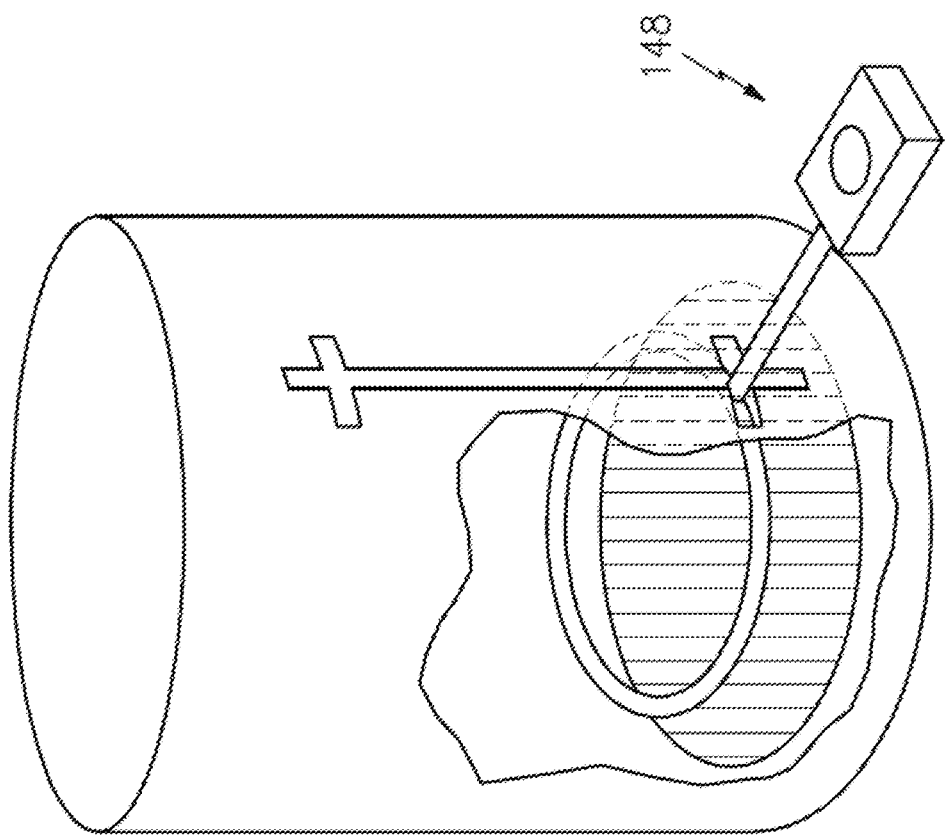
FIG. 9 is a side sectional view of the ignition article of FIG. 5 associated with the fuel chamber of FIG. 3 and configured in the first configuration, in accordance with one embodiment of the invention.
Figure 10A:
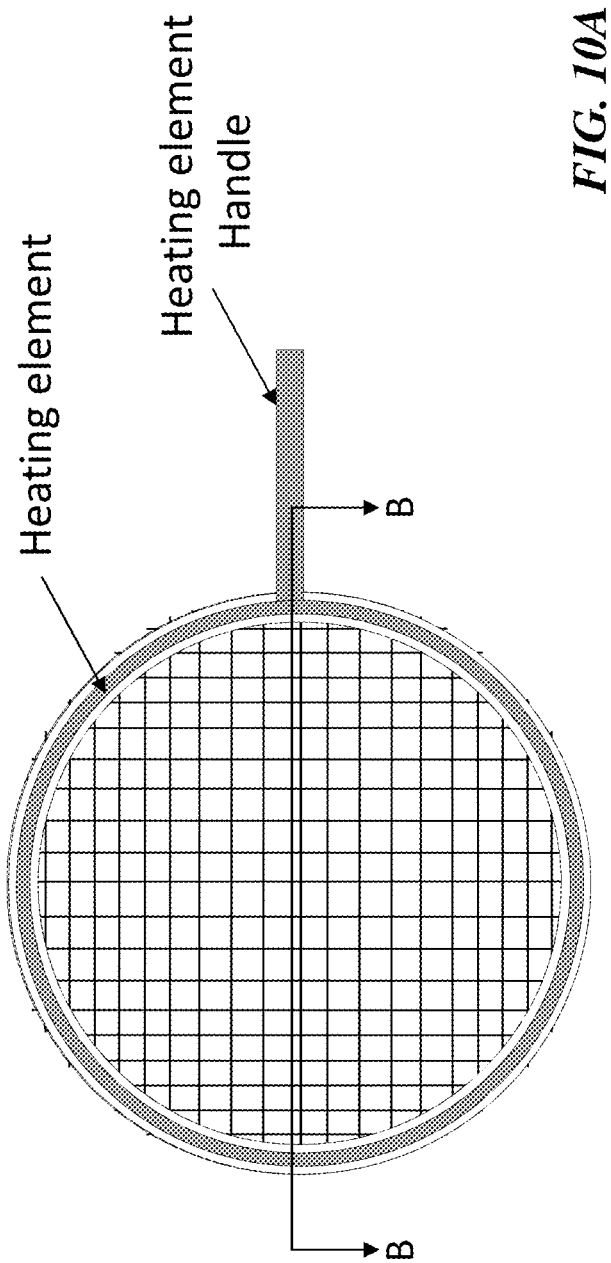
FIG. 10A is a top down view of the ignition article of FIG. 5 associated with the fuel container of FIG. 4A, when the ignition article is in the first configuration, in accordance with one embodiment of the invention.
Figure 10B:
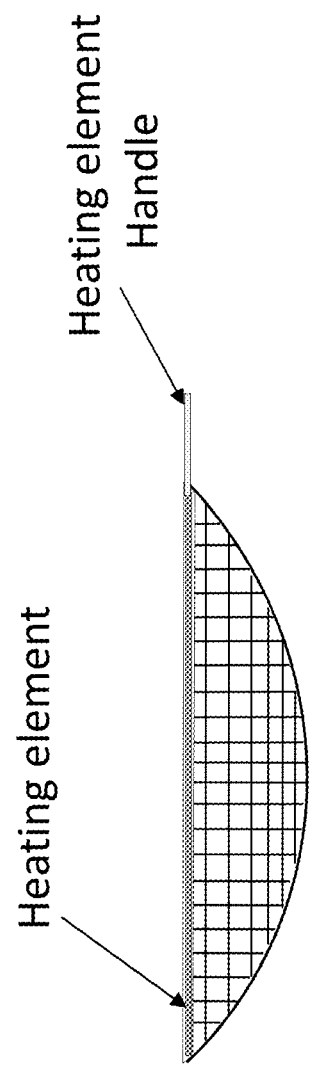
FIG. 10B is a side sectional view of the ignition article of FIG. 5 associated with the fuel container of FIG. 4A, when the ignition article is in the first configuration, in accordance with one embodiment of the invention.
Figure 11A:
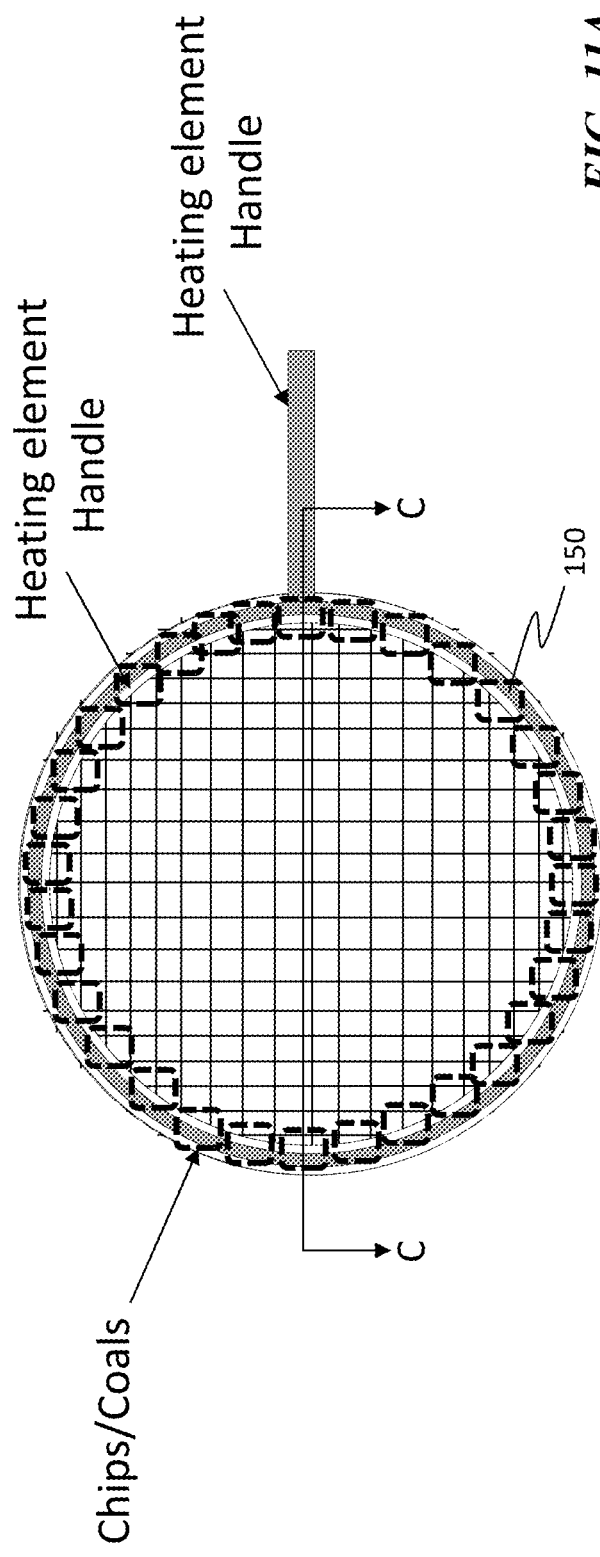
FIG. 11A is a top down view of the ignition article of FIG. 5 associated with the fuel container of FIG. 4A, when the ignition article is in the first configuration with coals ready for ignition, in accordance with one embodiment of the invention.
Figure 11B:
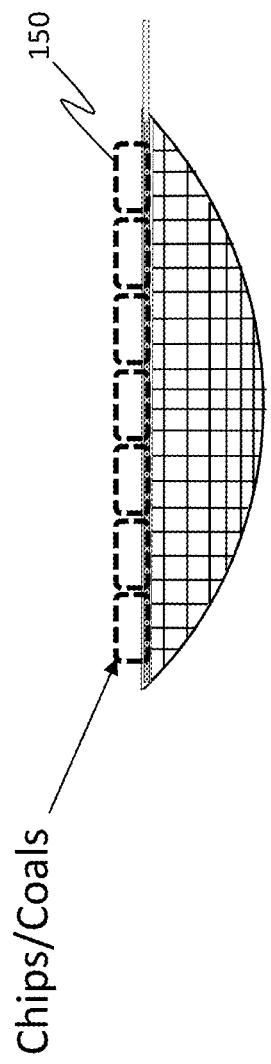
FIG. 11B is a side sectional view of the ignition article of FIG. 5 associated with the fuel container of FIG. 4A, when the ignition article is in the first configuration with coals ready for ignition, in accordance with one embodiment of the invention.

Referring to FIG. 6 through FIG. 14, the ignition article 138 is associated with the fuel chamber 104 to be in a first configuration 148 by inserting the ignition article 138 into the heat element slot 128 as shown in FIG. 6. The ignition article 138 is then located proximate the slot bottom 132 and the pair of prongs 146 are located within the bottom mounting holes 136 such that the ignition article 138 rests against the fuel chamber sidewall 124, as shown in FIG. 7 and FIG. 8. When in the first configuration 148 such that the ignition article 138 is located proximate the fuel chamber bottom 122, the heating element 144 is located within the fuel chamber cavity 118 and the ignition article handle 141 is located external to the fuel chamber structure 116, as shown in FIG. 9. Referring to FIG. 10A and FIG. 10B, when in the first configuration 148, the heating element 144 is located to be proximate the container rim 140 of the fuel support platform 126. Referring to FIG. 11A and FIG. 11B, this advantageously allows coals 150 (or other fuels, like wood chips) to be placed on the container rim 140 so that the heating element 144 is located between the coals 150 and container rim 140.

Figure 12:
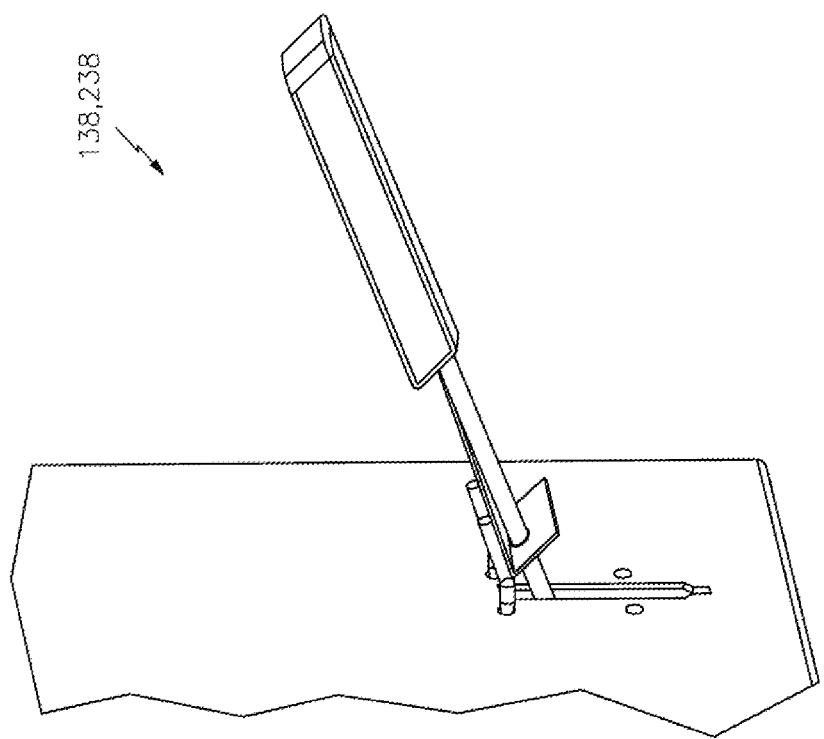
FIG. 12 is a side perspective view of the ignition article of FIG. 5 associated with the fuel chamber of FIG. 3 being configured from the first configuration into a second configuration, in accordance with one embodiment of the invention.
Figure 13:
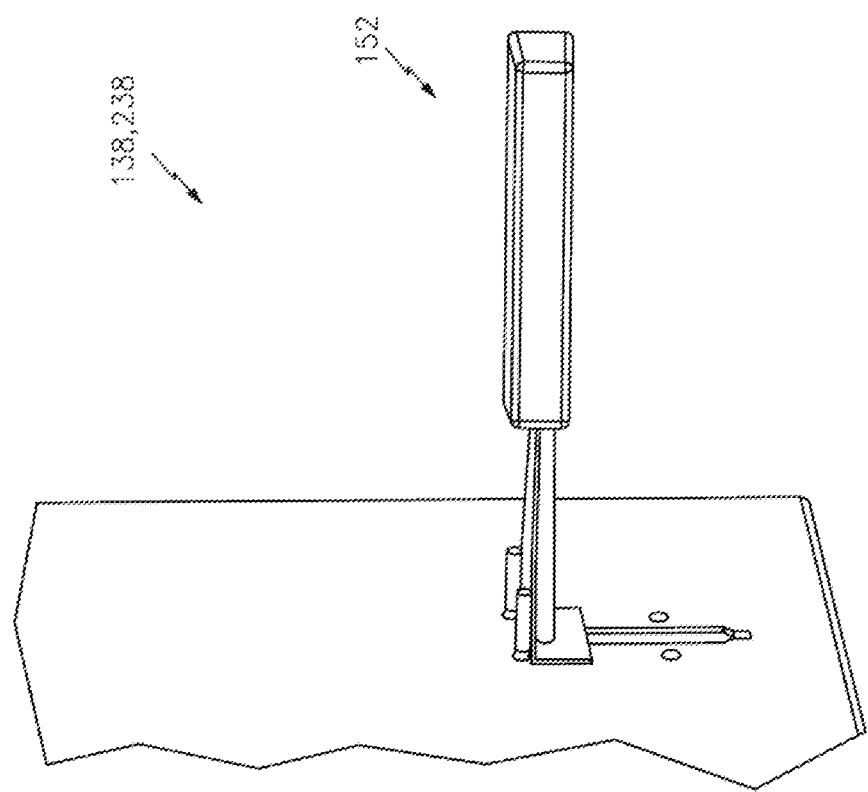
FIG. 13 is a side perspective view of the ignition article of FIG. 5 associated with the fuel chamber of FIG. 3 configured in the second configuration, in accordance with one embodiment of the invention.
Figure 14:
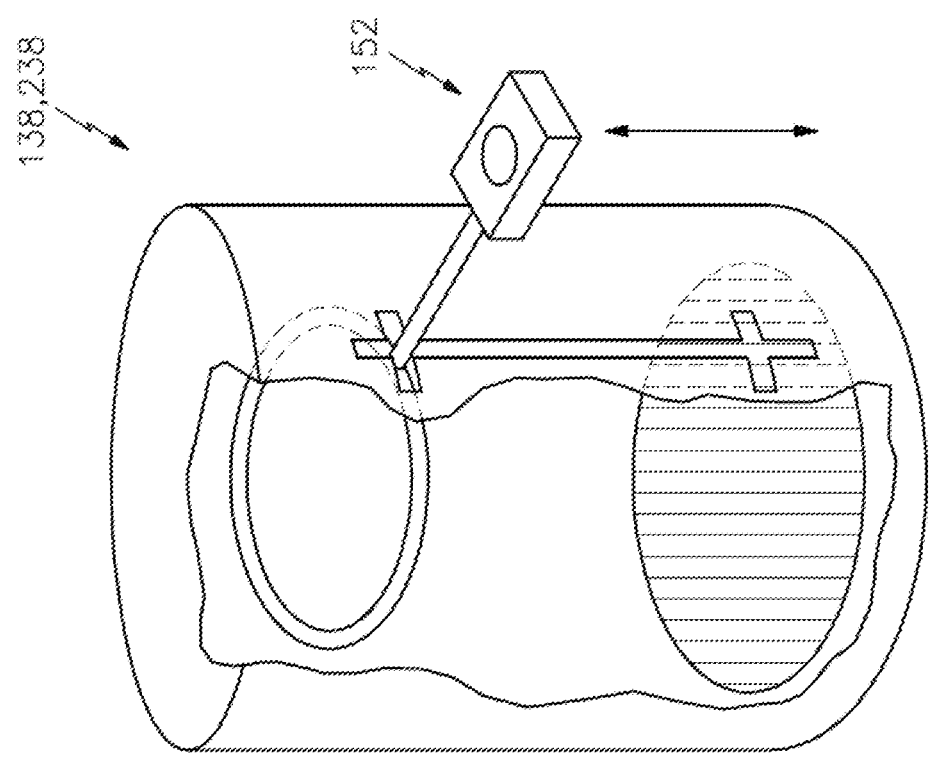
FIG. 14 is a side sectional view of the ignition article of FIG. 5 associated with the fuel chamber of FIG. 3 configured in the second configuration, in accordance with one embodiment of the invention.
Figure 15A:
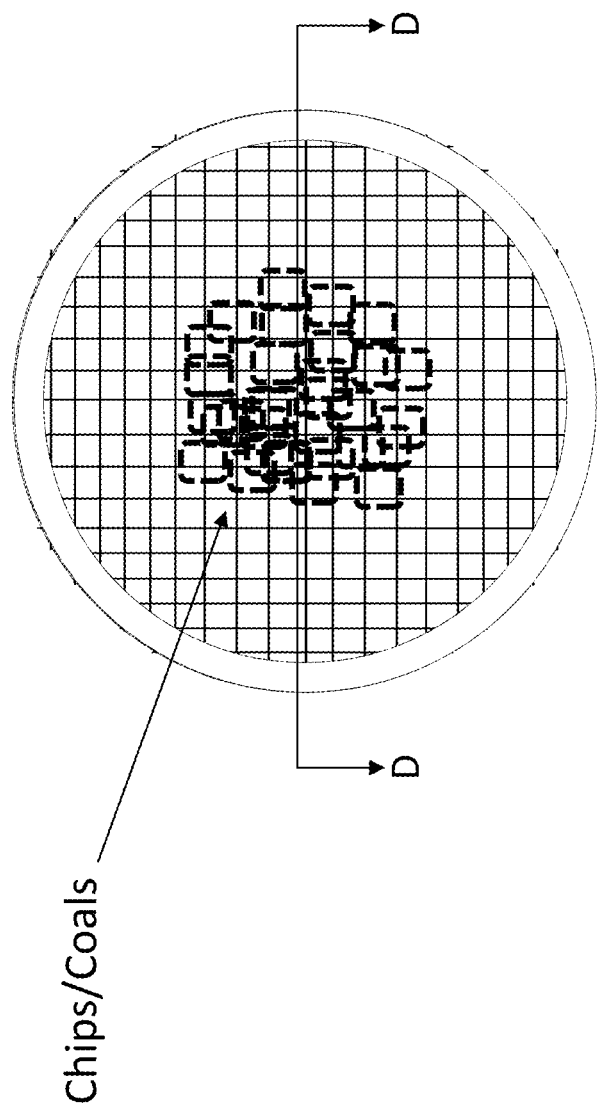
FIG. 15A is a top down view of the fuel container of FIG. 4A, when the ignition article is in the second configuration with coals being located in the fuel support structure, in accordance with one embodiment of the invention.
Figure 15B:
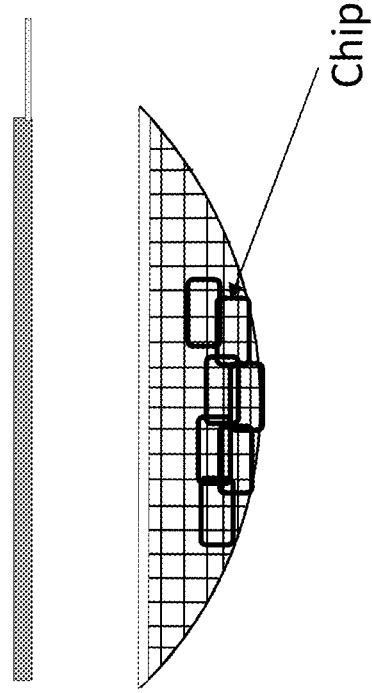
FIG. 15B is a side sectional view of the fuel container of FIG. 4A, when the ignition article is in the second configuration with coals being located in the fuel support structure, in accordance with one embodiment of the invention.
Figure 16:
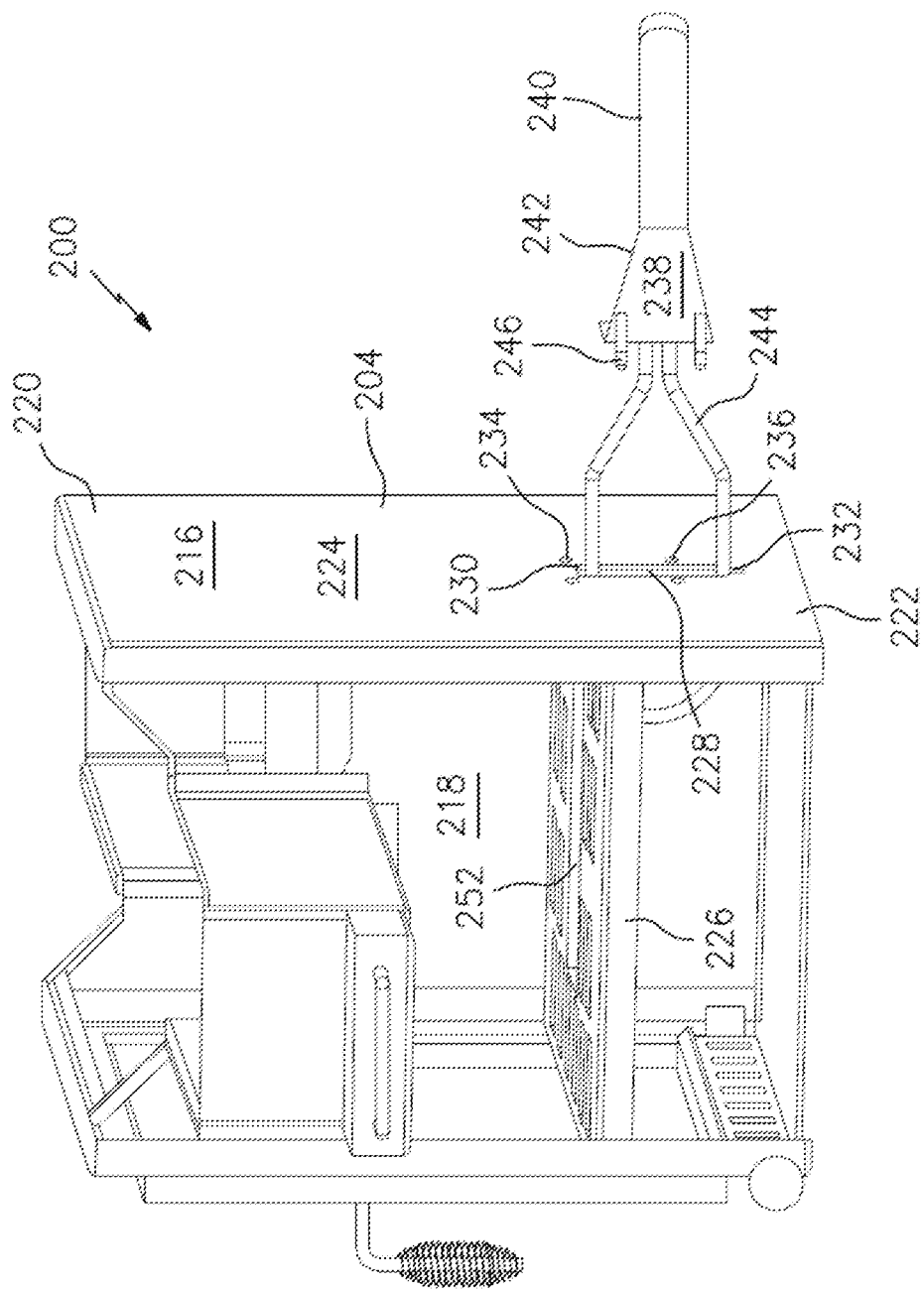
FIG. 16 is a side view of a fuel container for a meat smoker device showing the ignition article of FIG. 5 being associated with the fuel container, in accordance with an additional embodiment of the invention.

When the ignition article 138 is operated and the heating element 144 heats up to ignite the coals 150, the ignition article 138 is configured into a second configuration 152 by moving the ignition article handle 141 such that the pair of prongs 146 is removed from the bottom mounting holes 136 and moving the ignition article 138 within the heating element slot 128 to be located proximate the slot top 130. The ignition article 138 is then configured such that the pair of prongs 146 is located within the top mounting holes 134 such that the ignition article 138 rests against the fuel chamber sidewall 124, as shown in FIG. 11, FIG. 12 and FIG. 13. It should be appreciated that this advantageously causes the coals 150 that were located on the heating element 144 and the container rim 140 to fall into the fuel support structure 142. Additionally, this advantageously locates the heating element 144 away from the fire and heat of the burning coals 150 (or other fuel), as shown in FIG. 15A and FIG. 15B. It should be further appreciated that when the heating element 144 is located proximate the slot top 130, the heating element 144 may be used to cook meat that is contained within the smoking/cooking chamber 102 and to maintain the temperature within the within the smoking/cooking chamber 102.

Referring again to FIG. 1, it should be appreciated that a shielding article 154 may be included and may be located within the fuel chamber cavity 118 above the fuel container 138 so that the smoke and heat generated from the burning coal 150 (or other fuel) acts further isolate the heating element 144 from the heat and fire when the ignition article 138 is configured in the second configuration 152. Accordingly, the heating element 144 and the shielding element 154 may be shaped and sized relative to each other such that when the ignition article 138 is configured between the first configuration 148 and the second configuration 152, the shielding element 154 passes through the heating element 144.

Referring to FIG. 16 through FIG. 22, a meat smoker/cooker device 200 is shown and includes a cooking/smoking chamber (not shown) and a fuel chamber 204, in accordance with another embodiment of the invention. The cooking/smoking chamber includes a chamber structure which defines a chamber cavity for containing meat to be cooked and/or smoked. The chamber structure further defines a chamber cavity opening which allows access to the chamber cavity. The chamber structure further includes a chamber cover which is configured to be movably associated with the chamber cavity opening to allow the chamber cavity to be open or enclosed thus allowing access to the chamber cavity. The cooking/smoking chamber further includes at least one support device for supporting meat during the smoking and/or cooking process. The support device preferably includes openings (such as grated grill) to allow smoke and heat to contact the meat contained on the support device. This advantageously allows the meat to be grilled as desired.

The fuel chamber 204 includes a fuel chamber structure 216 which defines a fuel chamber cavity 218 and includes a fuel chamber top 220, a fuel chamber bottom 222 and a fuel chamber sidewall 224. The fuel chamber 204 includes a fuel support platform 226 located within the fuel chamber cavity 218 for holding fuel, such as wood chips, coal, etc. The fuel chamber sidewall 224 includes a heat element slot 228 having a slot top 230 and a slot bottom 232 and extending vertically along the fuel chamber sidewall 224. Additionally, the heating element slot 228 includes at least one top mounting hole 234 located proximate the slot top 230 and at least one bottom mounting hole 236 located proximate the slot bottom 232. Referring again to FIG. 5, the meat smoker device 200 further includes an ignition article 238 having an ignition article handle 240, an ignition article mounting structure 242 and a heating element 244. It should be appreciated that the ignition article 238 is configurable between a first configuration 248 (See FIG. 22) and a second configuration 250 (See FIG. 19) and that the ignition article mounting structure 242 includes a pair of prongs 246 for engaging the top and bottom mounting holes 234, 236 when in the first and second configurations 248, 250, in a similar fashion as described above. It should be further appreciated that the fuel support platform 226 includes a platform opening 252 which allows the heating element 244 to contact (or be in very close proximity) to the fuel when the ignition article 238 is in the first configuration 248.

Figure 17:
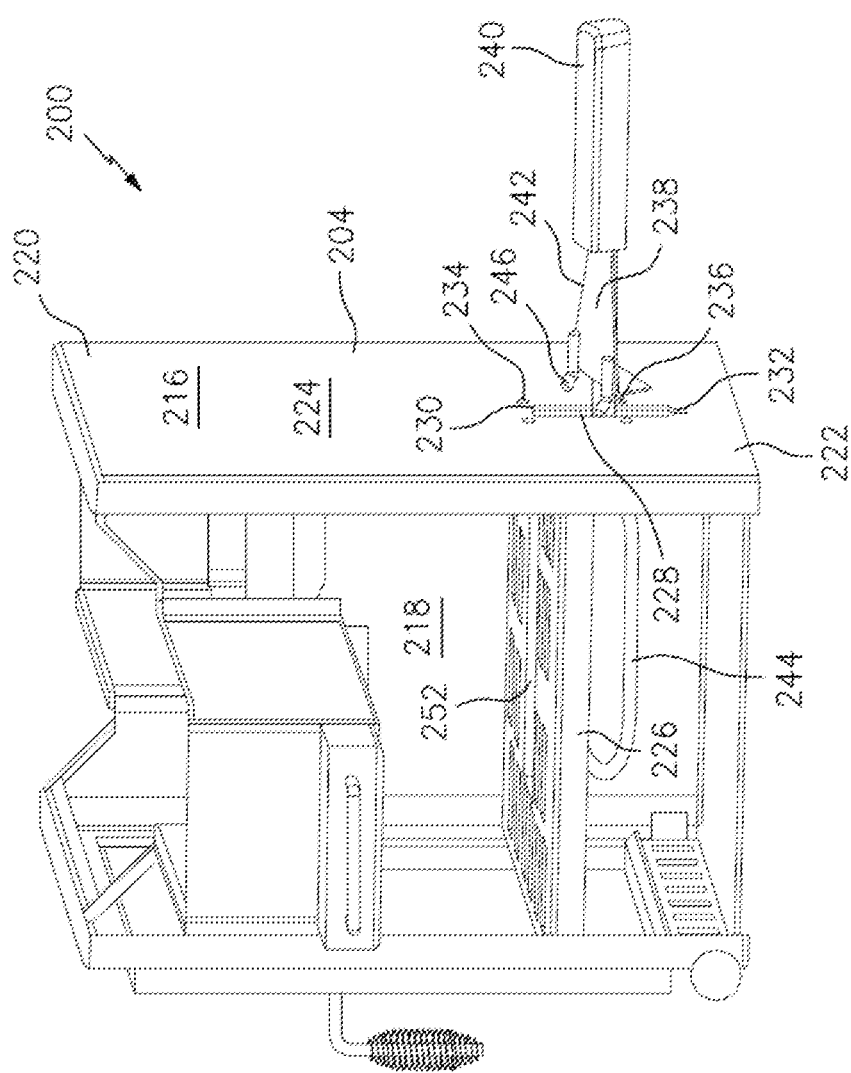
FIG. 17 is a side view of the ignition article of FIG. 5 associated with the fuel chamber of FIG. 16 being configured into a second configuration, in accordance with an additional embodiment.
Figure 18:
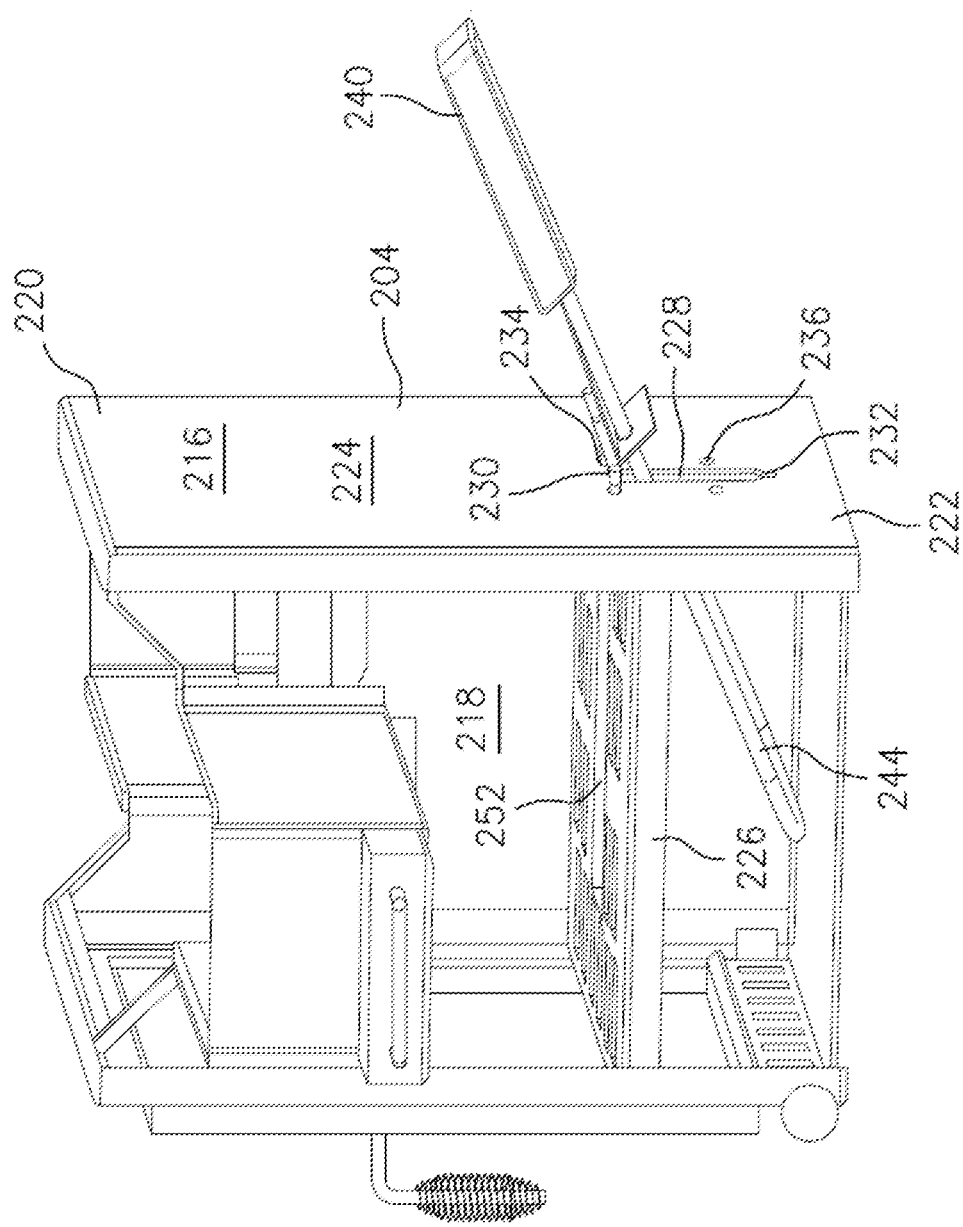
FIG. 18 is a side view of the ignition article of FIG. 5 associated with the fuel chamber of FIG. 16 being configured into a second configuration, in accordance with an additional embodiment.
Figure 19:
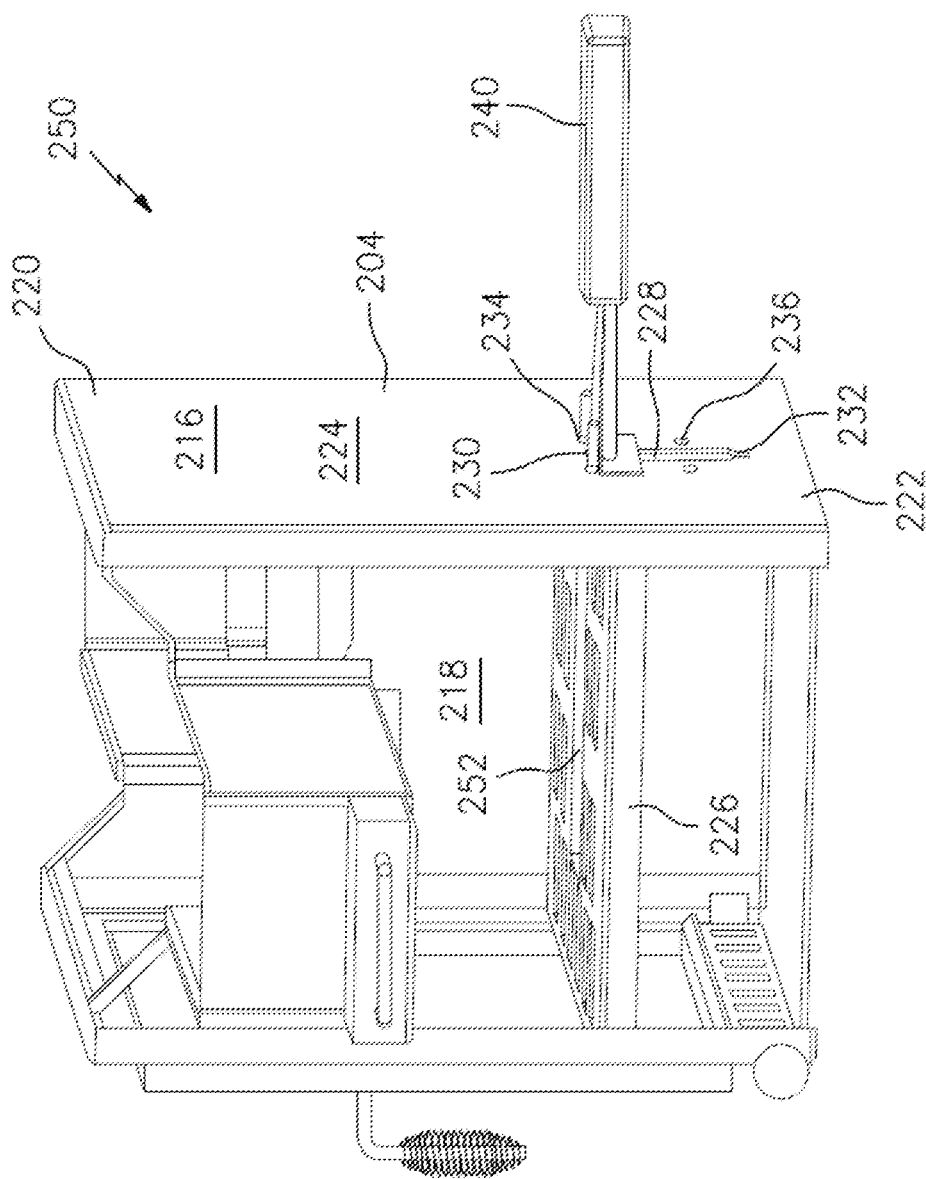
FIG. 19 is a side view of the ignition article of FIG. 5 associated with the fuel chamber of FIG. 16 in a second configuration, in accordance with an additional embodiment.

Referring again to FIG. 16 through FIG. 22, the ignition article 238 is associated with the fuel chamber 204 to be in the second configuration 250 (or the first configuration 248 as desired) by inserting the ignition article 238 into the heat element slot 228 as shown in FIG. 16. The ignition article 238 is then located proximate the slot top 230 and the pair of prongs 246 are located within the first pair of mounting holes 234 such that the ignition article 238 rests against the fuel chamber sidewall 224, as shown in FIG. 17, FIG. 18 and FIG. 19. When in the second configuration 250, the heating element 244 is located within the fuel chamber cavity 218 and the ignition article handle 240 is located external to the fuel chamber structure 216, as shown. Additionally, when in the second configuration 250, the heating element 244 is located to be proximate the platform opening 252 of the fuel support platform 226. This advantageously allows coals (or other fuels, like wood chips) to be placed on the fuel support platform 226 so that the heating element 244 is located proximate to or in contact with the fuel to be ignited.

Figure 20:
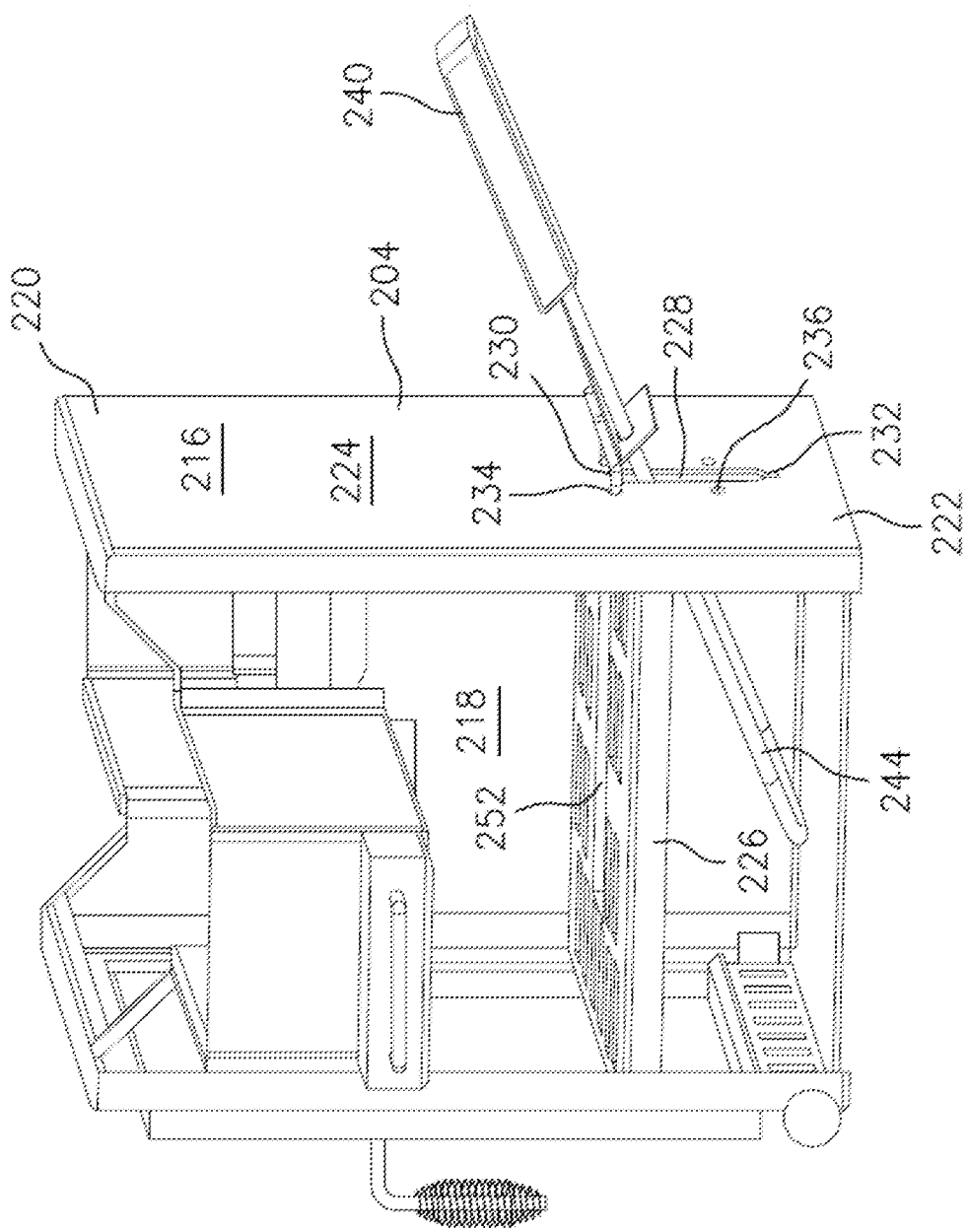
FIG. 20 is a side view of the ignition article of FIG. 5 associated with the fuel chamber of FIG. 16 being configured from a second configuration to a first configuration, in accordance with an additional embodiment.
Figure 21:
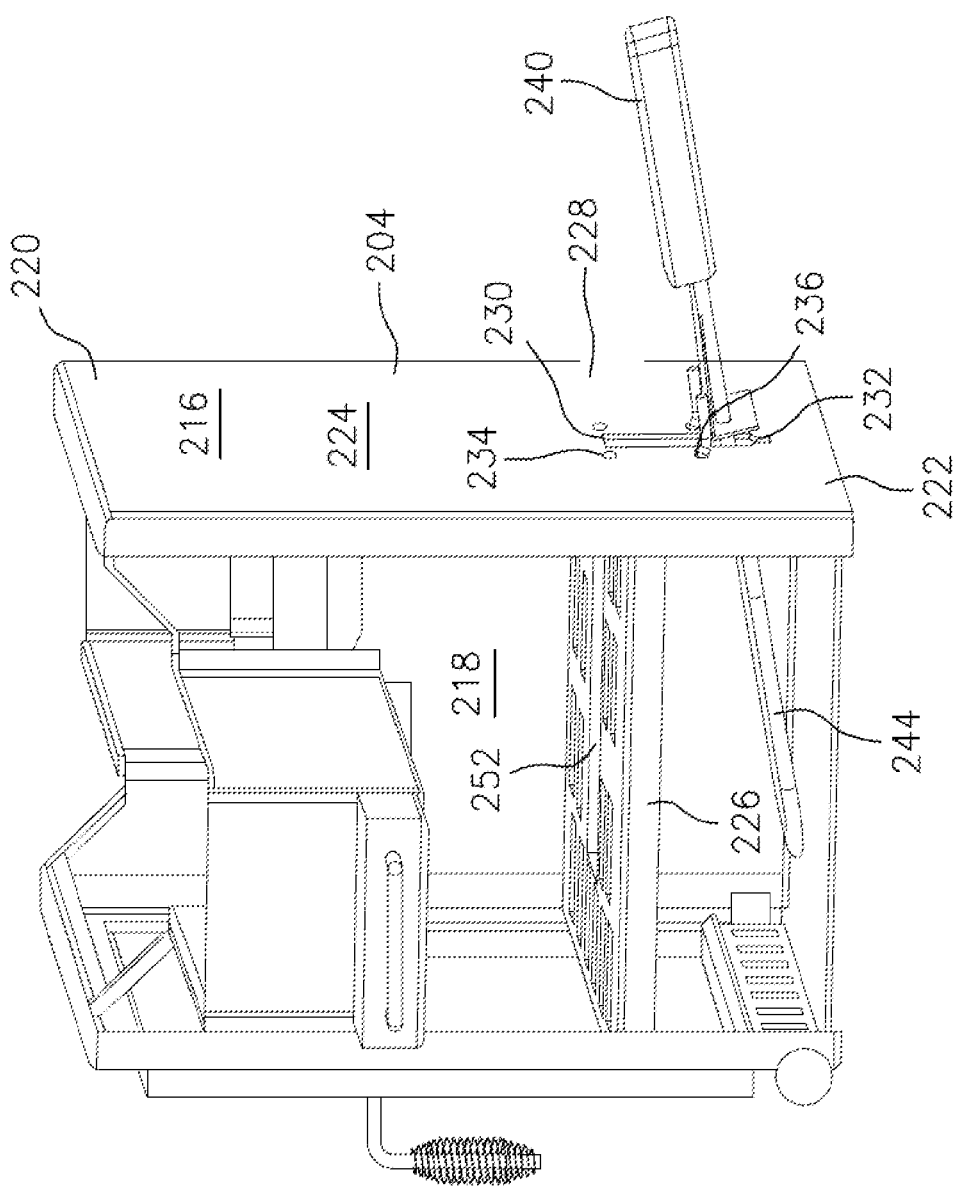
FIG. 21 is a side view of the ignition article of FIG. 5 associated with the fuel chamber of FIG. 16 being configured from a second configuration to a first configuration, in accordance with an additional embodiment.
Figure 22:
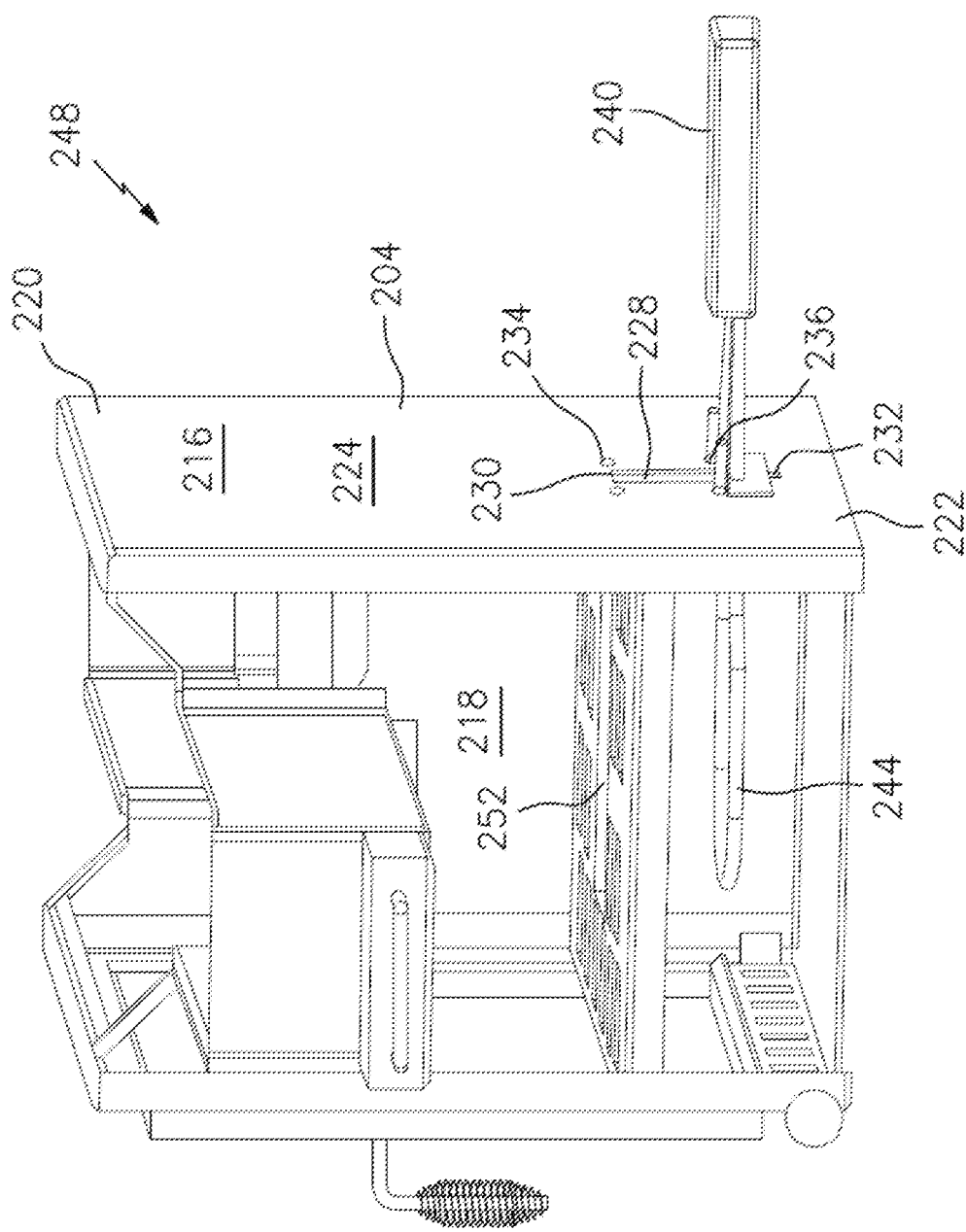
FIG. 22 is a side view of the ignition article of FIG. 5 associated with the fuel chamber of FIG. 16 in a first configuration, in accordance with an additional embodiment.

When the ignition article 238 is operated and the heating element 244 heats up, the fuel is ignited. At this point, the ignition article 238 is located away from the burning fuel and heat by configuring the ignition article 238 into the first configuration 248 by moving the ignition article handle 240 such that the pair of prongs 246 is removed from the top mounting holes 234 and moving the ignition article 238 within the heating element slot 228 to be located proximate the slot bottom 132. The ignition article 238 is then configured such that the pair of prongs 246 is located within the bottom mounting holes 236 such that the ignition article 238 rests against the fuel chamber sidewall 224, as shown in FIG. 20, FIG. 21 and FIG. 22. It should be appreciated that this advantageously locates the heating element 244 away from the fire and heat of the burning coals (or other fuel).

Figure 23:
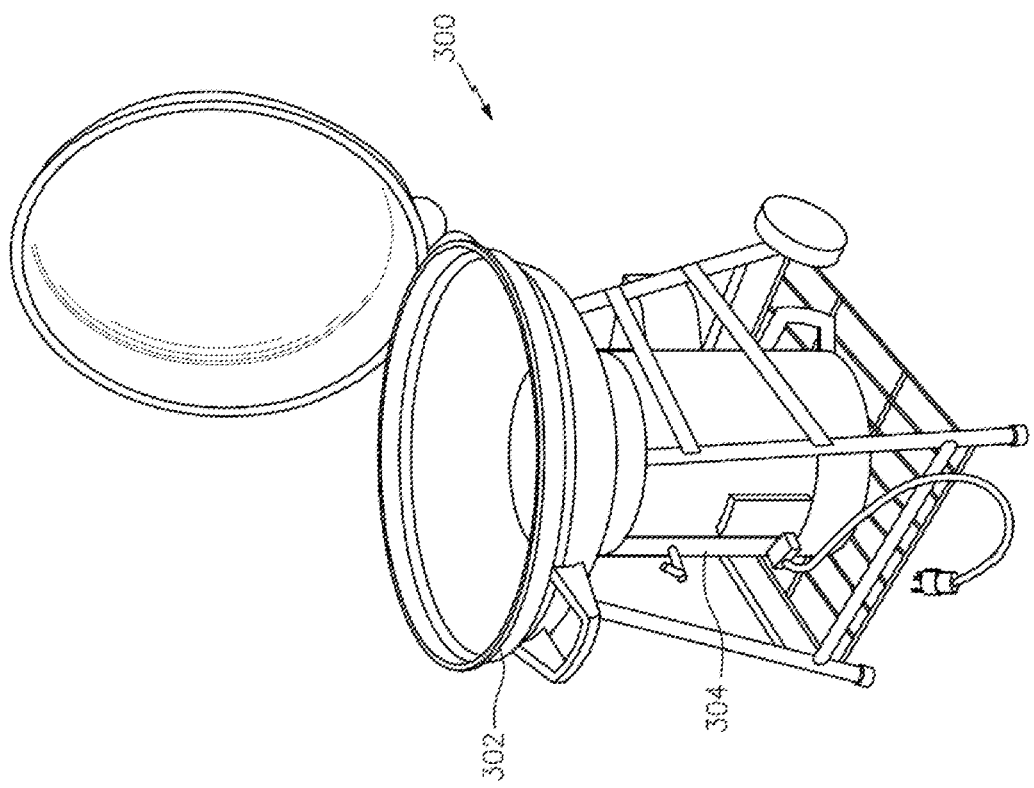
FIG. 23 is a side perspective view of a meat cooker/smoker device, in accordance with another embodiment of the present invention.
Figure 24:
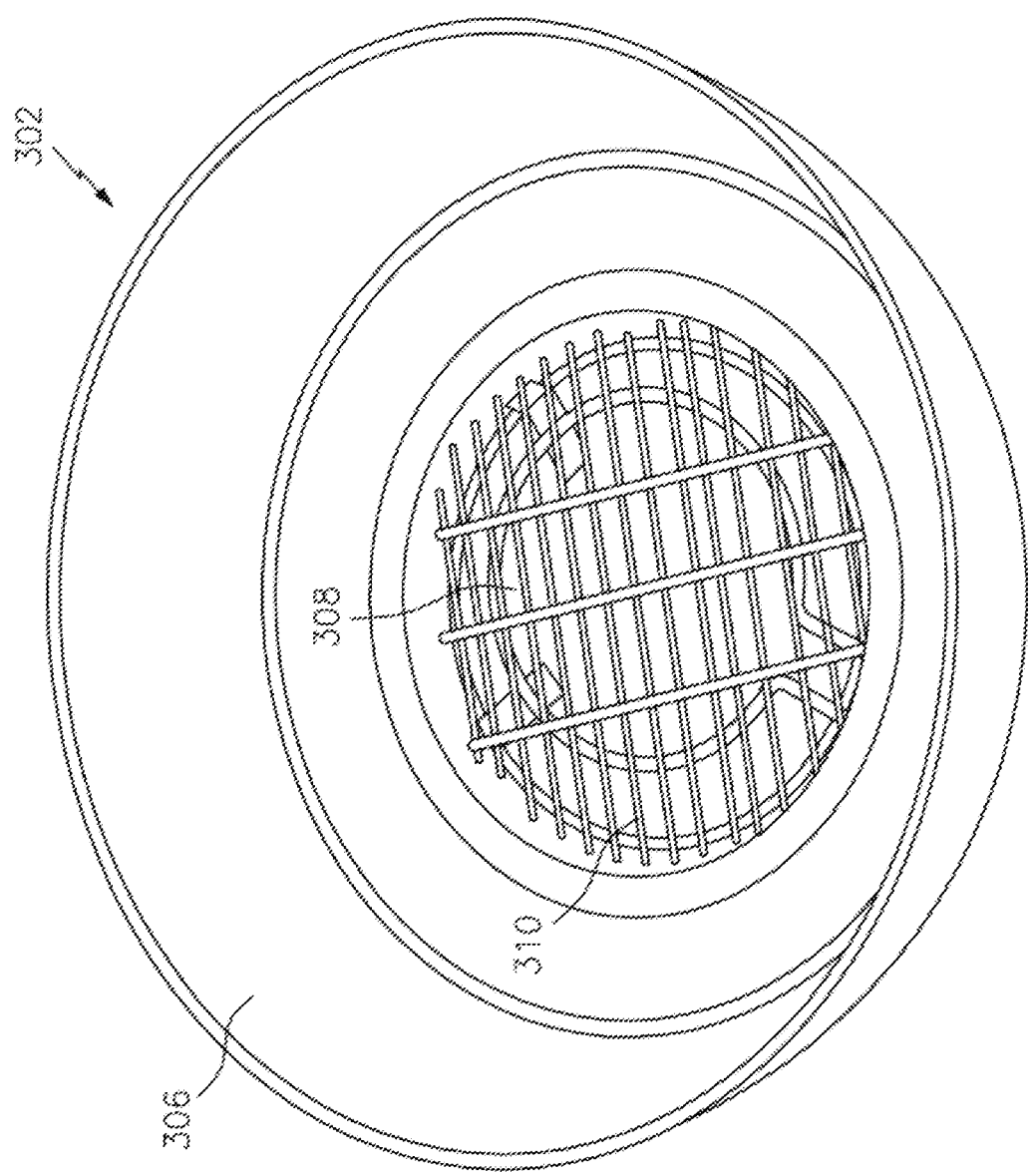
FIG. 24 is a top down view of a smoking/cooking chamber of the meat cooker/smoker device of FIG. 23.
Figure 25:
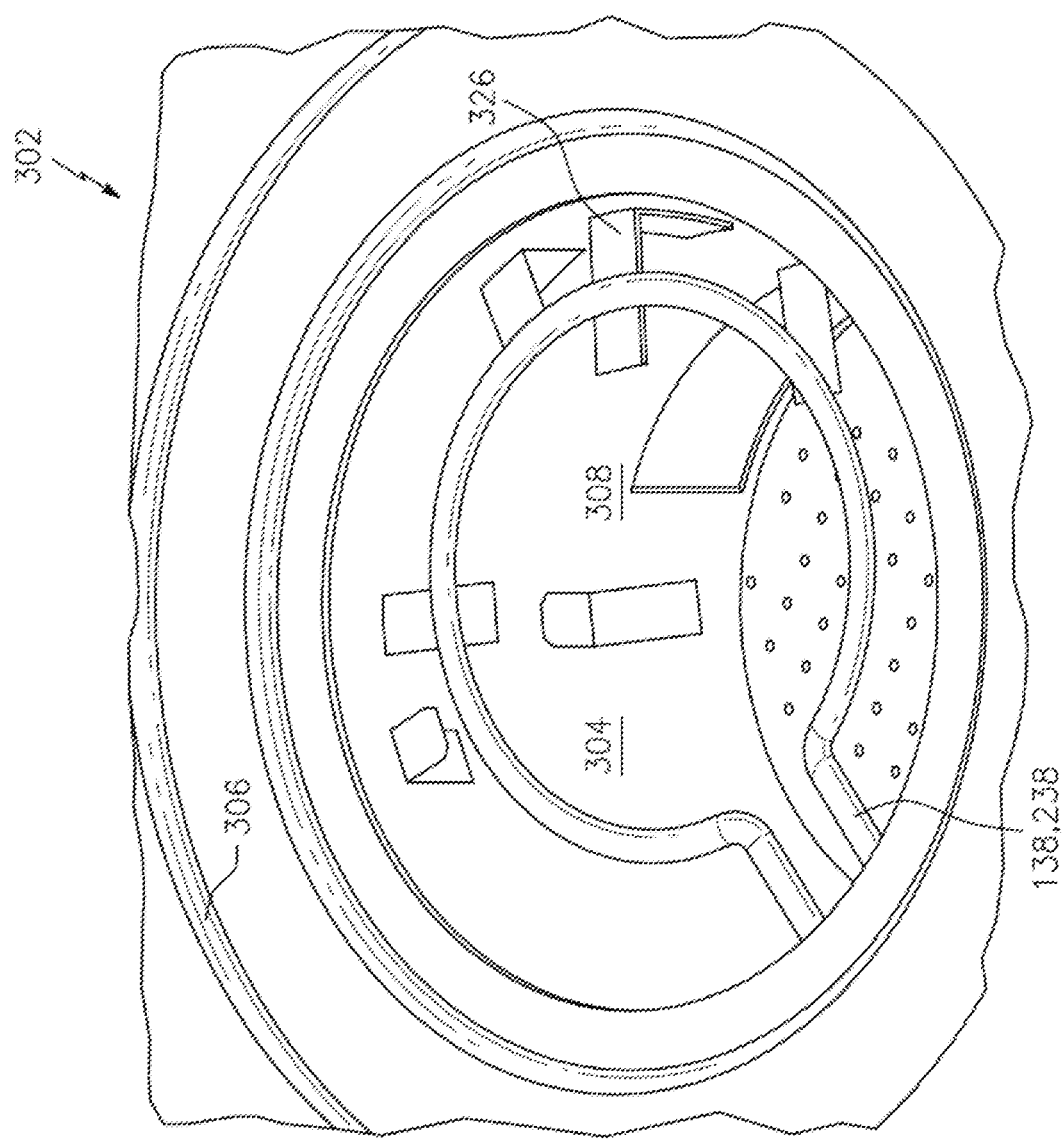
FIG. 25 is a top down view of a smoking/cooking chamber of the meat cooker/smoker device of FIG. 23.

Referring to FIG. 23 through FIG. 30, a meat smoker/cooker device 300 is shown and includes a cooking/smoking chamber 302 and a fuel chamber 304, in accordance with still yet another embodiment of the invention. Referring to FIG. 23, FIG. 24 and FIG. 25, the cooking/smoking chamber 302 includes at least one support element 306 for supporting cooking grates (not shown) that are configured to hold the meat being cooked and/or smoked. Although the support element 306 is shown as being disposed along the internal surface of the entire surface of the cooking/smoking chamber 302, it is contemplated that that support element 306 may also only be located on each side of the internal surface of the cooking/smoking chamber 302. The cooking/smoking chamber 302 includes an opening 308 located on a bottom portion of the cooking/smoking chamber 302, wherein the opening 308 is communicated with the fuel chamber 304. It is contemplated that a grated structure 309 may or may not be included to cover the opening 308. This opening 308 advantageously allows for smoke and heat to rise into the cooking/smoking chamber 302 from the fuel chamber 304 to cook and/or smoke meat that is located on the supporting cooking grates inside the cooking/smoking chamber 302.

Figure 26:
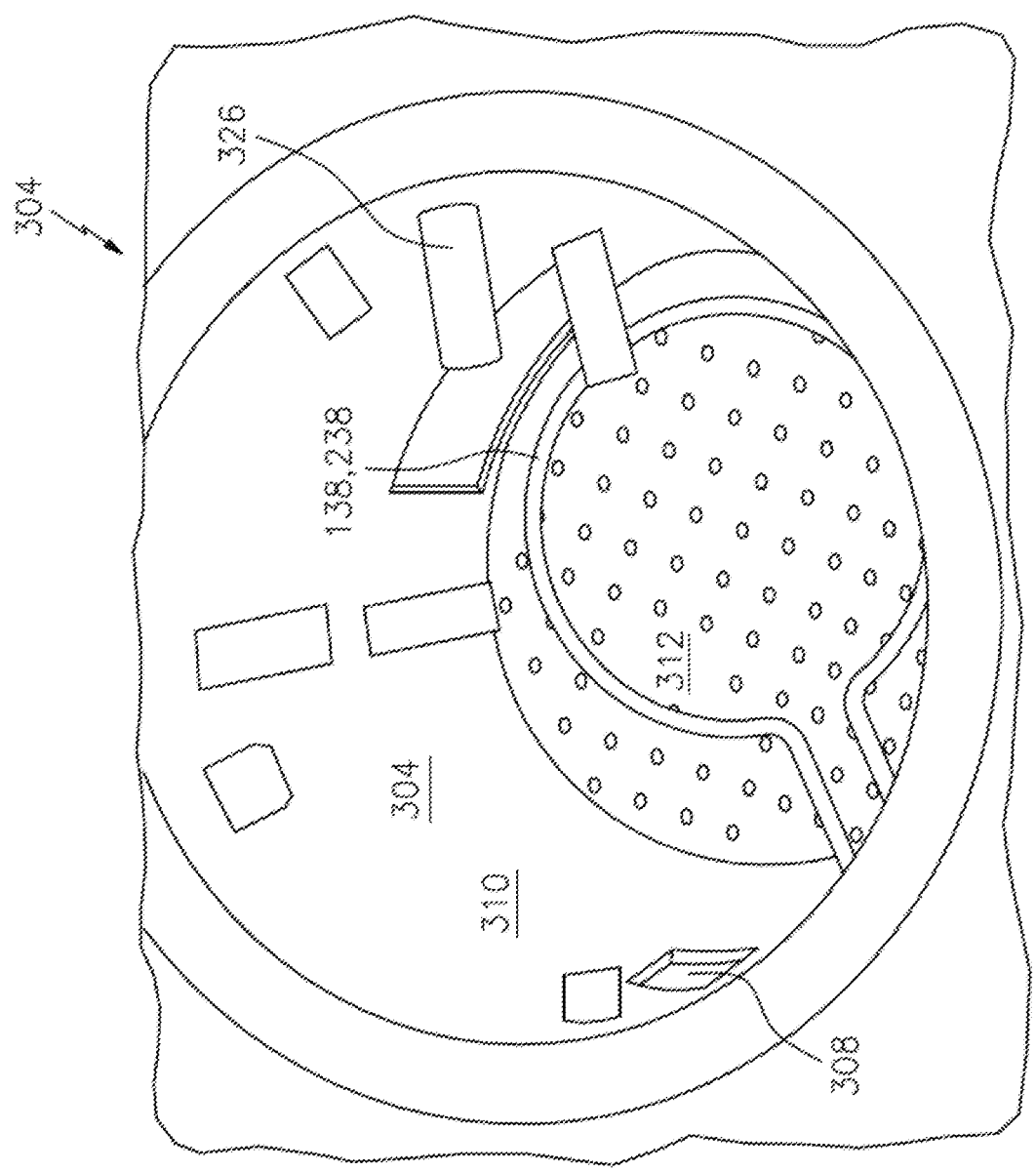
FIG. 26 is a top down view of a smoking/cooking chamber of the meat cooker/smoker device of FIG. 23.
Figure 27:
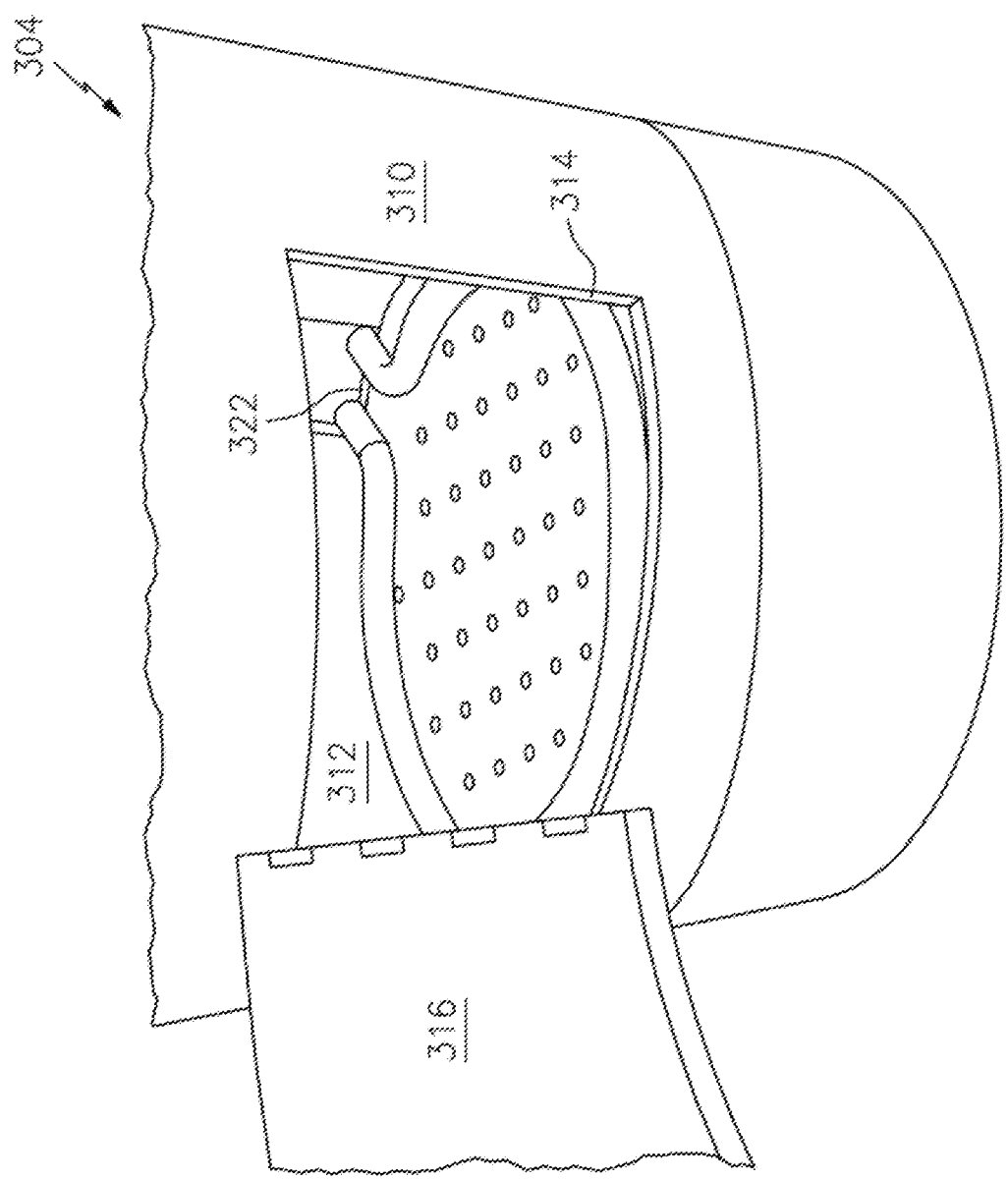
FIG. 27 is a side view of a fuel chamber of the meat cooker/smoker device of FIG. 23.
Figure 28:
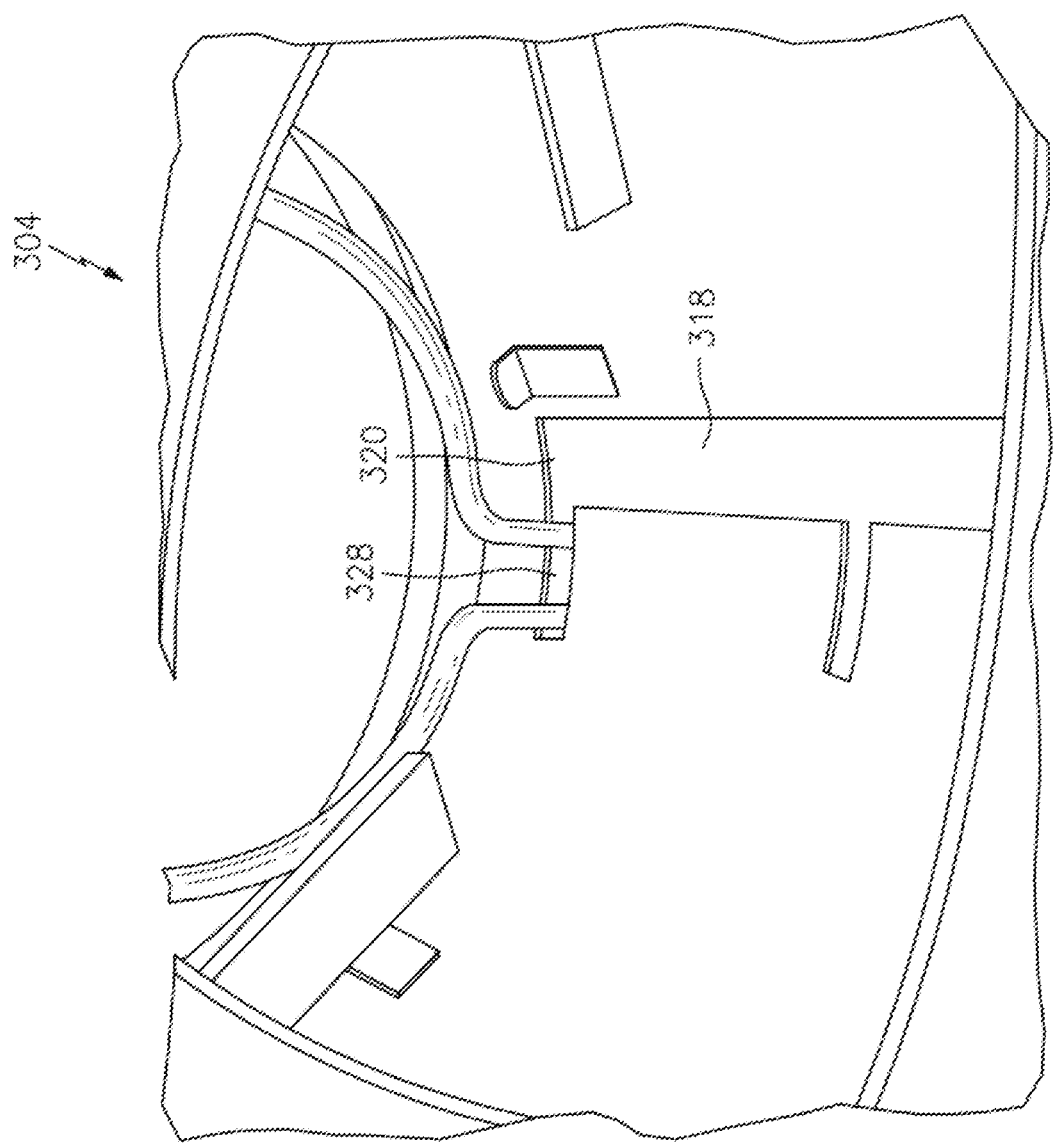
FIG. 28 is a bottom side up view of a fuel chamber of the meat cooker/smoker device of FIG. 23.

Referring to FIG. 26, FIG. 27 and FIG. 28, the fuel chamber 304 includes a fuel chamber structure 310 which defines a fuel chamber cavity 312. The chamber structure 310 includes a first structure opening 314 communicated with the fuel chamber cavity 312. Also, that chamber structure 310 also includes a first structure opening cover 316 which is configurable between a first configuration (closed) and a second configuration (opened). When configured in the first configuration, the first structure opening cover 316 is located proximate the first structure opening 314 to limit and/or prevent access to the fuel chamber cavity 312. When configured in the second configuration, the first structure opening cover 316 is located away from the first structure opening 314 to allow access to the fuel chamber cavity 312. The fuel chamber structure 310 also includes a structure slot 318 which extends at least partially between the top of the fuel chamber structure 310 and the bottom of the fuel chamber structure 310, wherein the structure slot 318 includes a slot top 320 and a slot bottom 322.

Figure 29:
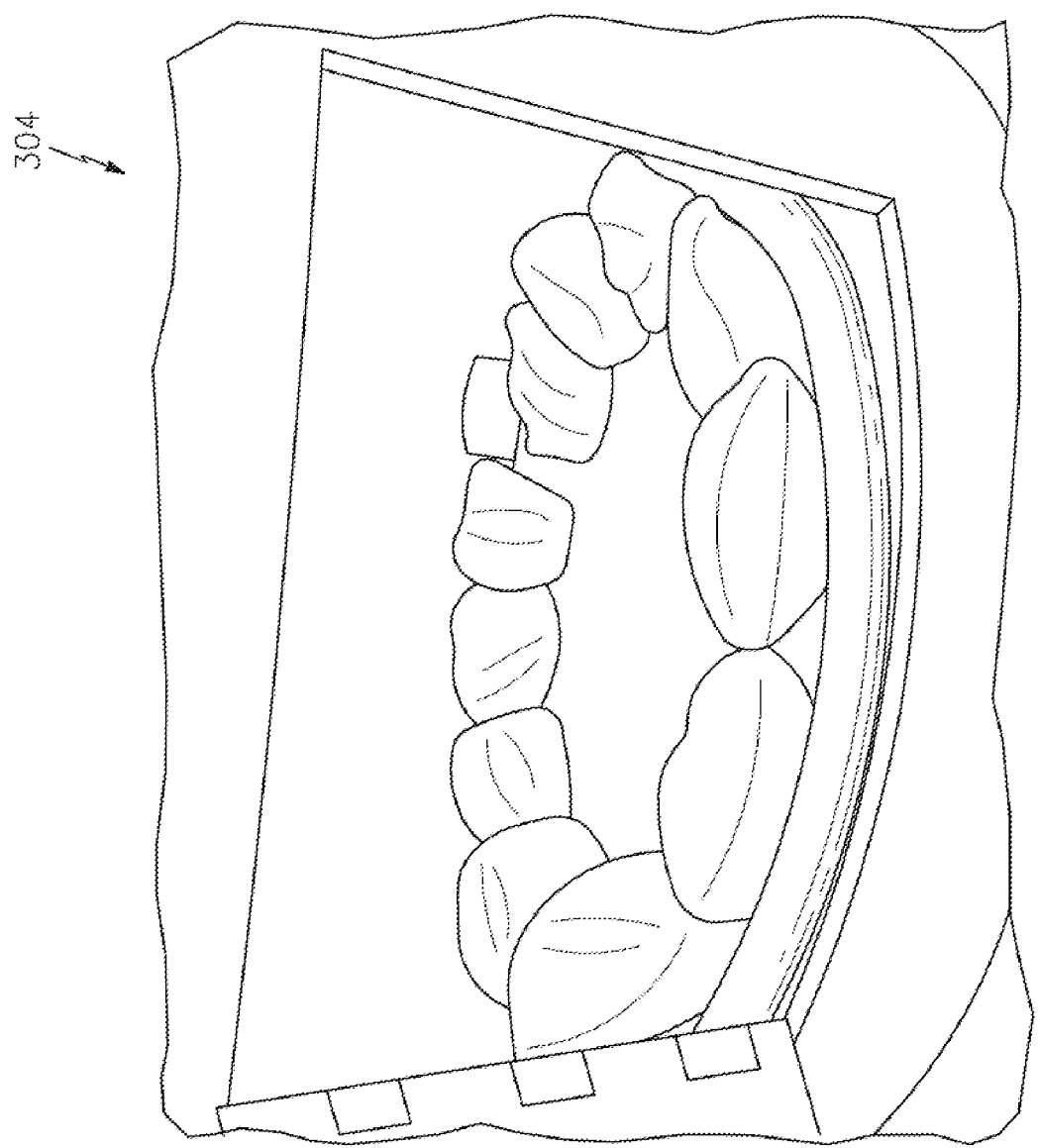
FIG. 29 is a side view of fuel chamber of the meat cooker/smoker device of FIG. 23 showing charcoal associated with a heating element.
Figure 30:
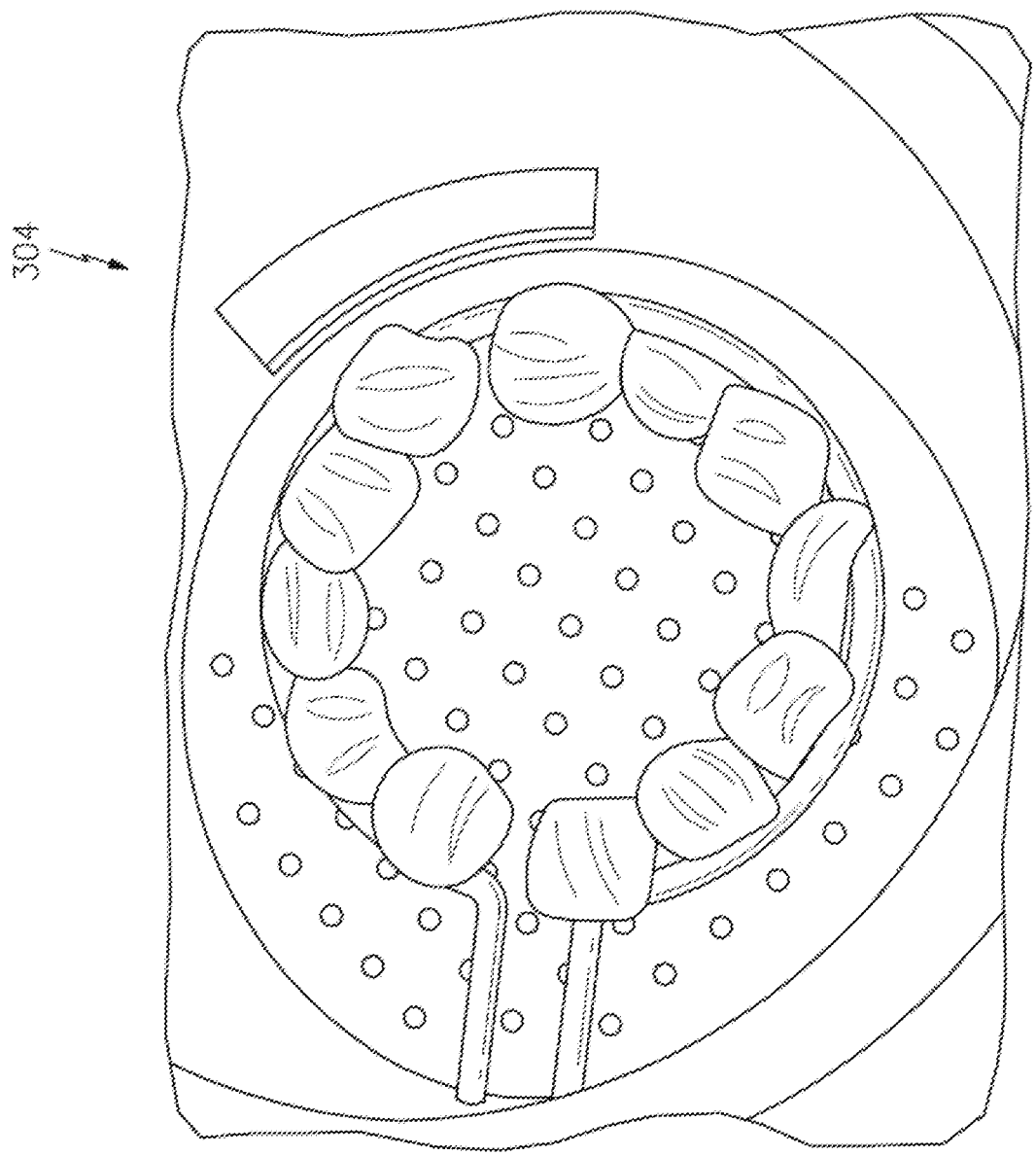
FIG. 30 is a top down view of fuel chamber of the meat cooker/smoker device of FIG. 23 showing charcoal associated with a heating element.

It should be appreciated that the structure slot 318 is configured to allow a heating element 144, 244 to be configured between a first configuration and a second configuration, wherein when in the second configuration, the heating element 144, 244 is securely located proximate the slot top 320 (See FIG. 28) and when in the first configuration, the heating element 144, 244 is securely located proximate the slot bottom 322 (See FIG. 29). It should be appreciated that the heating element 144, 244 may be securely located via any method or device suitable to the desired end purpose, such as that disclosed herein with regards to the other embodiments 100, 200. Referring to FIG. 25 and FIG. 28, another embodiment for securely locating the heating element 144, 244 is shown and includes a side wall support element 326 and a slot support element 328. In this case, when the heating element 144, 244 is located in either the first configuration or the second configuration, the portion of the heating element 144, 244 located proximate the handle rests on the slot support element 328 and the end of the heating element 144, 244 rests on the side wall support element 326.

Referring to FIG. 28 and FIG. 29, when used as a smoker, the heating element 144, 244 is configured in the first configuration such that the heating element 144, 244 is located proximate the slot bottom 322 and the bottom of the fuel chamber cavity 312. Fuel, such as charcoal or wood, is arranged to be partially located on top of the heating element 144, 244. The heating element 144, 244 is then operated to cause the fuel to ignite. When the fuel has ignited the heating element 144, 244 is the configured to be in the second configuration such that the heating element 144, 244 is located proximate the slot top 320 and the top of the fuel chamber cavity 312. This advantageously locates the heating element 144, 244 away from the burning fuel to prevent damage to the heating element 144, 244. It should be appreciated that when the ignition article 138, 238 is configured in the second configuration such that the heating element 144, 244 is located proximate the slot top 320 and the top of the fuel chamber cavity 312, the heating element 144, 244 can be used to cook/grill the meat/food that is located in the cooking/smoking chamber 102 on the cooking grates.

Accordingly, it should be appreciated that the heating element 144, 244 may be used to ignite the cooking/smoking fuel (coals, woods), maintain the temperature of the meat/food being cooked and/or temperature inside of the cooking/smoking chamber 102, 302 and/or as a grilling element to grill the meat/food and/or as mentioned above, to light the grill fire (i.e. the coals of the grilling grate), as desired.

Figure 31:
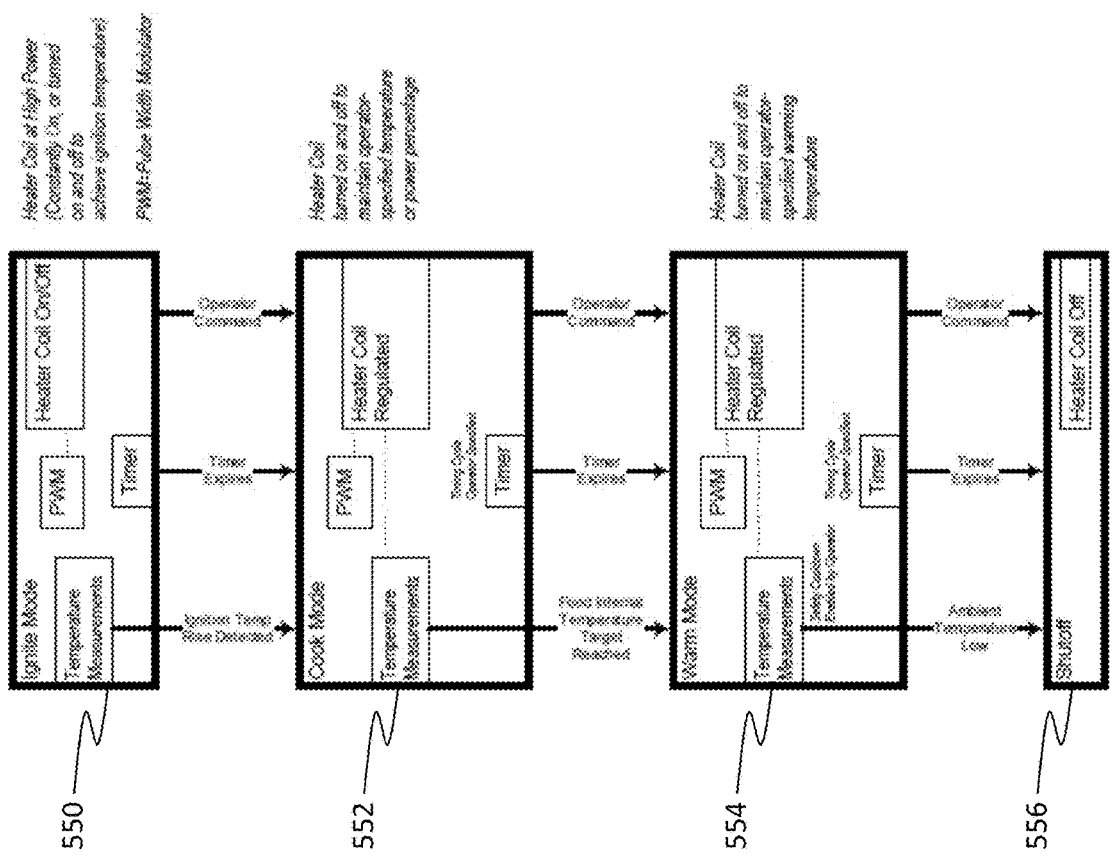
FIG. 31 is a schematic block diagram illustrating one embodiment of the modes of operation of the meat cooker/smoker device of the invention.
Figure 32:
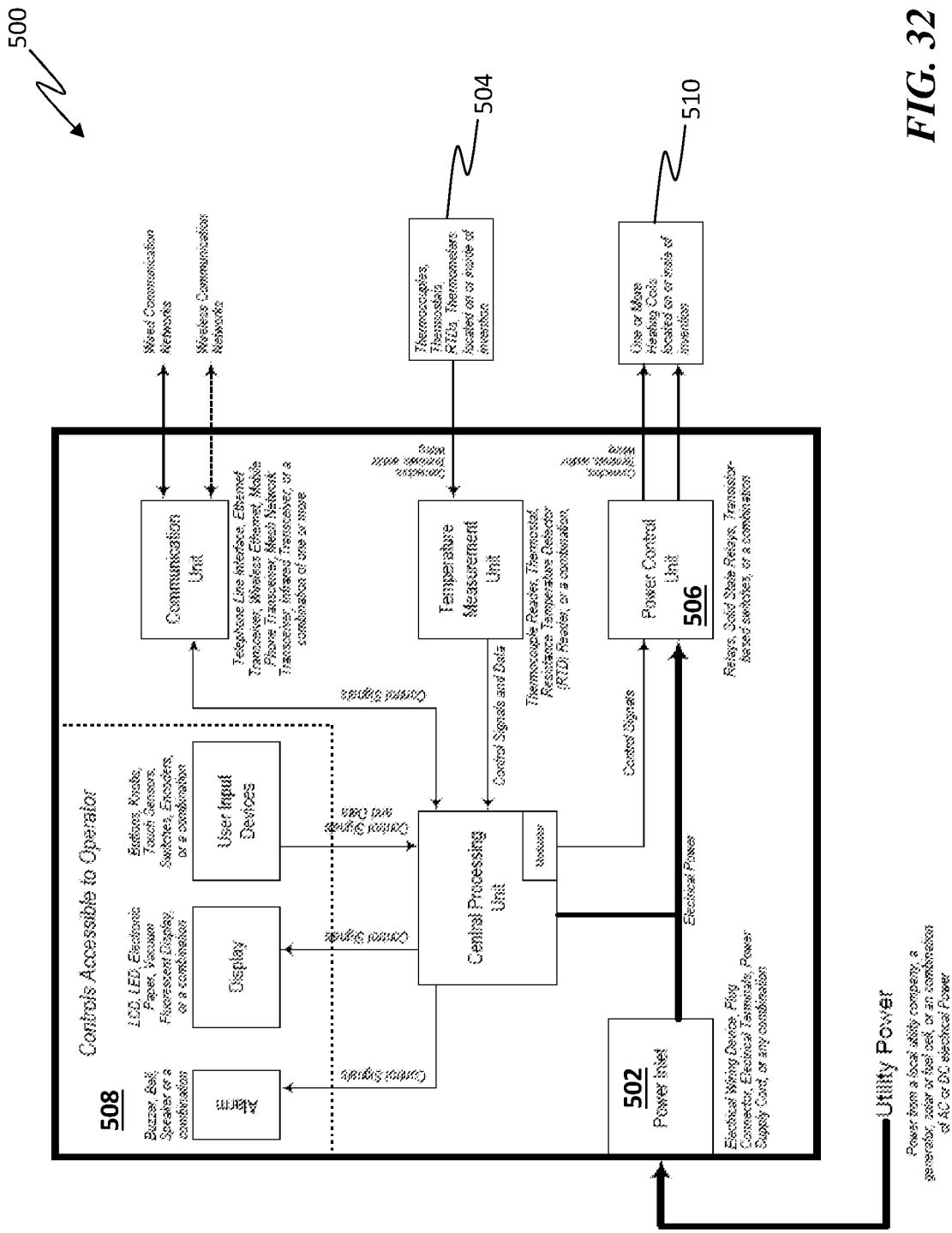
FIG. 32 is an operational block diagram illustrating one embodiment of an Electronic Control System of the meat cooker/smoker device of the invention.

In accordance with still yet another embodiment of the invention and as shown in FIG. 31 and FIG. 32, the meat smoker/cooker device 100, 200, 300, 700 may include an electronic control system (ECS) 500 which controls the power to, and thus the heat generated by, the heating element 144, 244. This controllability supports and allows for the multiple modes of operation of the meat smoker/cooker device 100, 200, 300, 700 wherein the different modes of operation may require different amounts of heat to be delivered in a timed manner. It should be appreciated that these differing modes of operation may include an Ignition Mode (IM) 550, a Cooking Mode (CM) 552, a Warming Mode (WM) 554 and a Safety Mode (SM) 556, each of which are discussed hereinafter. In accordance with one embodiment of the invention, the electronic control system 500 may include a power inlet 502, at least one temperature sensing device 504, a power control unit 506, a user interface 508 and a power outlet 510, wherein the power inlet 502 is configured to receive power from at least one of a battery, a generator and/or a utility electrical grid. The at least one temperature sensing device 504 may be located at one or more locations within the meat smoker/cooker device 100, 200, 300, such as the cooking/smoking chamber and/or the fuel chamber to sense the temperature within the cooking/smoking chamber of the meat smoker/cooker device 100, 200, 300, 700 and/or to sense whether ignition of the fuel was achieved. Additionally, the at least one temperature sensing device 504 may also include a sensor capable of sensing the temperature of the food being cooked/smoked, such as a meat thermometer that is inserted into the meat during cooking/smoking. Additionally, temperature sensors may also be located within the fuel chamber and infrared sensors may be used to sense the temperatures as well.

When in IM 550, the heating element 144, 244 is operated to produce sufficient energy (heat) to ignite the cooking/smoking fuel contained within the meat smoker/cooker device 100, 200, 300. When the cooking/smoking fuel is ignited, the heating element 144, 244 is operated at a temperature lower than that required to ignite the cooking/smoking fuel. In some instances, the heating element 144, 244 may be de-energized. This advantageously prevents and/or minimizes the risk that damage will occur to the heating element 144, 244 due to combination of heat from the ignited fuel and the heat generated from the heating element 144, 244. As the fuel becomes depleted, the heating element 144, 244 may be operated to maintain a desired temperature within the smoker/cooker device 100, 200, 300. It should be appreciated that, if desired, the heating element may be operated in a cyclic or periodic fashion based on a desired temperature pattern.

Accordingly, in one embodiment when the meat smoker/cooker device 100, 200, 300, 700 is operated in IM 550, the heating element 144, 244 is powered to cause the fuel to ignite. After a predetermined period of time (which may be controlled) or if the fuel does not ignite (which may be sensed via a sensor), the heating element 144, 244 will be turned off (i.e. de-energized) to prevent damage to the heating element 144, 244 and/or to conserve energy. Additionally, the operator may manually turn off the heating element 144, 244 as desired. Upon completion of the IM 550

(or as desired), the meat smoker/cooker device 100, 200, 300, 700 may be configured into the CM 552.

When the meat smoker/cooker device 100, 200, 300, 700 is in the CM 552, the temperature within the meat smoker/cooker device 100, 200, 300, 700 is maintained and/or controlled based on the application. For example, the successful smoking of meat typically requires maintenance of consistent heat over long periods of time, where the heat required for the CM 552 is typically much lower than the heat required for the IM 550. The meat smoker/cooker device 100, 200, 300, 700 accomplishes this by regulating the power supplied to the heating element 144, 244 based on the one or more temperature sensing devices 504 within (and in some cases outside of) the cooking/smoking chamber of the meat smoker/cooker device 100, 200, 300. Accordingly, in one embodiment an operator may set the meat smoker/cooker device 100, 200, 300, 700 such that a desired temperature is maintained within the cooking/smoking chamber of the meat smoker/cooker device 100, 200, 300, 700 and the ECS 500 will operate the heating element 144, 244 to maintain that temperature.

It should be appreciated that in one embodiment, during the period where the fuel is burning, the temperature may be significantly higher than a desired cooking temperature (such as a temperature set by the operator). In this situation, the ECS 500, which may sense this higher temperature, may delay or modify the regulation action of the heating element 144, 244 to achieve a desired end result, such as maintaining temperatures (or as close to temperatures as possible), termination of temperature after a period of time, and/or cycling of temperature over a period of time. In some instances, some cooking/smoking methodologies include changing temperature during the cooking interval followed by a different temperature(s) for a successive period. In another embodiment, the meat smoker/cooker device 100, 200, 300, 700 may allow for the operator to control the meat smoker/cooker device 100, 200, 300, 700 based on the total power capability of meat smoker/cooker device 100, 200, 300, 700. Thus, in this case the operator may control the meat smoker/cooker device 100, 200, 300, 700 by specifying a percentage of power to be used in lieu of (or in addition to) the specifying a temperature. Furthermore, in still yet another embodiment, the temperature control of the meat smoker/cooker device 100, 200, 300, 700 may be responsive to the temperature (internal/external) of the food. For example, the heating element 144, 244 may be turned off once a desired temperature of the food being cooked is reached, and/or the heating element 144, 244 may be cycled on/off to maintain a desired temperature of the food being cooked, and/or the power to the heating element 144, 244 may controlled such that the temperature of the heating element 144, 244 is controlled based, at least in part, on the temperature of the food being prepared. Upon completion of the CM 552 (or as desired), the meat smoker/cooker device 100, 200, 300, 700 may be configured into the WM 554.

It should be appreciated that cooked food is safe for consumption only if maintained within strict bands of temperatures after cooking, where the temperature bands are chosen to be higher and/or lower than those which encourage the growth of organisms which are harmful to human health.

When the meat smoker/cooker device 100, 200, 300, 700 is in the WM 554, the meat smoker/cooker device 100, 200, 300, 700 is configured to maintain the cooked/smoked food at a predetermined temperature (or within a predetermined temperature range). As above, the heating element 144, 244 may be operated in response to the temperature within the cooking chamber of the meat smoker/cooker device 100, 200, 300, 700 and/or the temperature of the food being prepared. Additionally, the meat smoker/cooker device 100, 200, 300, 700 may include a SM 556 which may offer an option to automatically shut off heating element 144, 244 to permit the prepared food to deliberately achieve ambient temperature if the ambient temperature is sufficiently low (such as during wintertime).

It should be appreciated that the meat smoker/cooker device 100, 200, 300, 700 may be operated manually and/or may be configurable into one or more of the above described operational modes as desired. Additionally, the meat smoker/cooker device 100, 200, 300, 700 may be programmable to operate with different types of foods (i.e. meats/produce) and the operation of the meat smoker/cooker device 100, 200, 300, 700 may be accomplished via hardware, software and/or a combination of hardware and software. It is contemplated that the operation of the meat smoker/cooker device 100, 200, 300, 700 may be accomplished wirelessly so that an operator can control the meat smoker/cooker device 100, 200, 300, 700 via a remote interface device. Moreover, the meat smoker/cooker device 100, 200, 300, 700 may include a heating element positioning device that is controllably associated with the ECS 500 such that the ECS 500 configures the heating element 144, 244 between the first configuration 148, 248 and the second configuration 152, 250.

Figure 33:
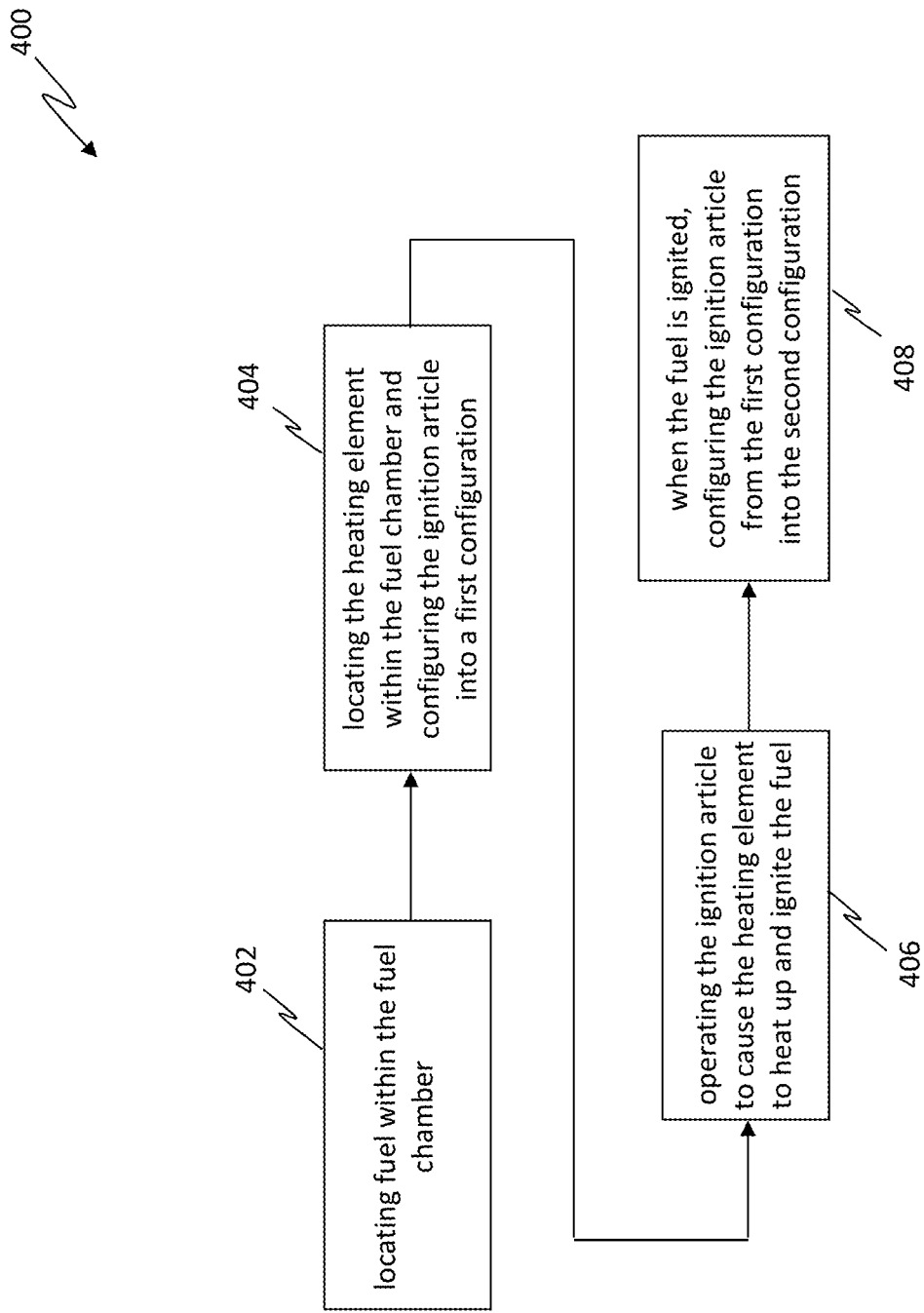
FIG. 33 is an operational block diagram illustrating a method for operating a meat cooker/smoker device, in accordance with one embodiment of the invention.

Referring to FIG. 33, an operational block diagram illustrating one embodiment of a method 400 for operating a meat smoker/cooker device 100, 200 300 is shown and includes locating meat within the smoking/cooking chamber 102, 202 and locating fuel within the fuel chamber 104 of a meat smoker/cooker device 100, 200 300, as shown in operational block 402. The ignition article 138, 238 is configured into the first configuration 148, 248 such that the heating element 144, 244 is located proximate the fuel (or in contact with the fuel) to be ignited, as shown in operational block 404. The ignition article 138, 238 is operated to cause the heating element 144, 244 to heat up and ignite the fuel, as shown in operational block 406. When the fuel is ignited and burning, the ignition article 138, 238 is configured into the second configuration 152, 248 such that the heating element 144, 244 is located away from the heat and burning fuel, as shown in operational block 408.

It should be appreciated that it is considered to be within the scope of the invention that individual elements of each of the embodiments disclosed herein may be applied between embodiments or may be used to create other embodiments, as desired.

Figure 34:
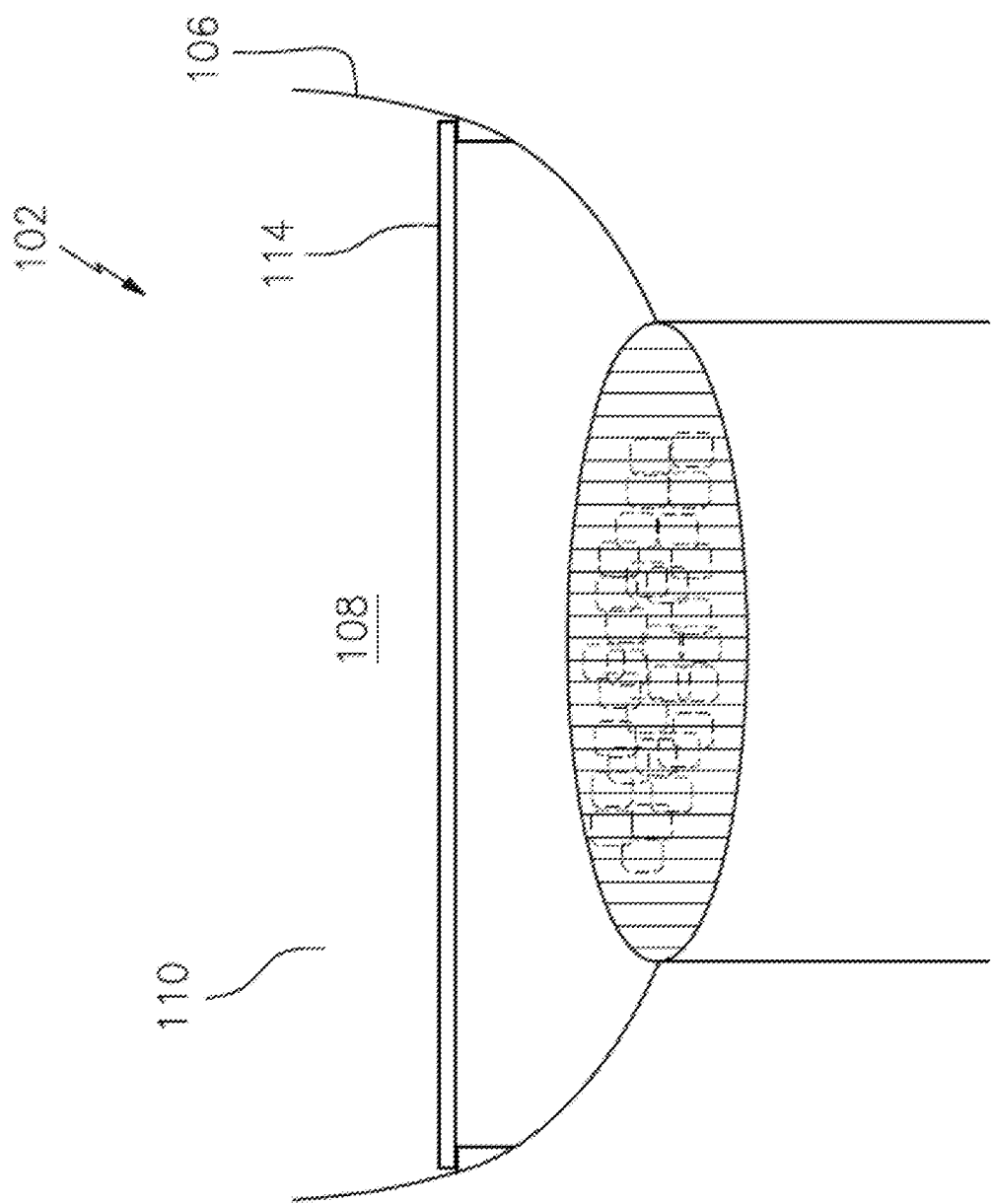
FIG. 34 is a side sectional view of the smoking/cooking chamber of the meat cooker/smoker device of FIG. 1 configured as a normal grill, in accordance with one embodiment of the invention.
Figure 35:
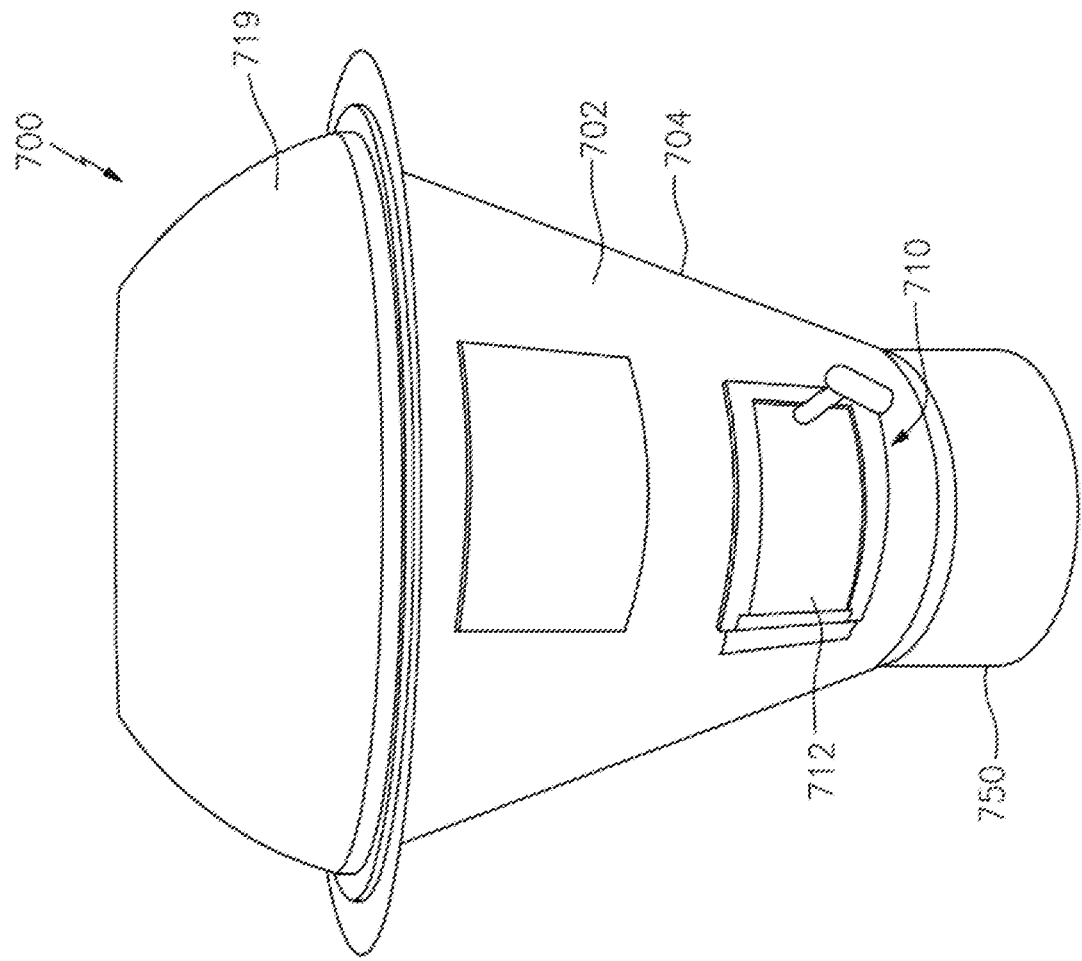
FIG. 35 is a side view of a smoking/cooking chamber with the cover in place, in accordance with still yet another embodiment of the invention.
Figure 36:
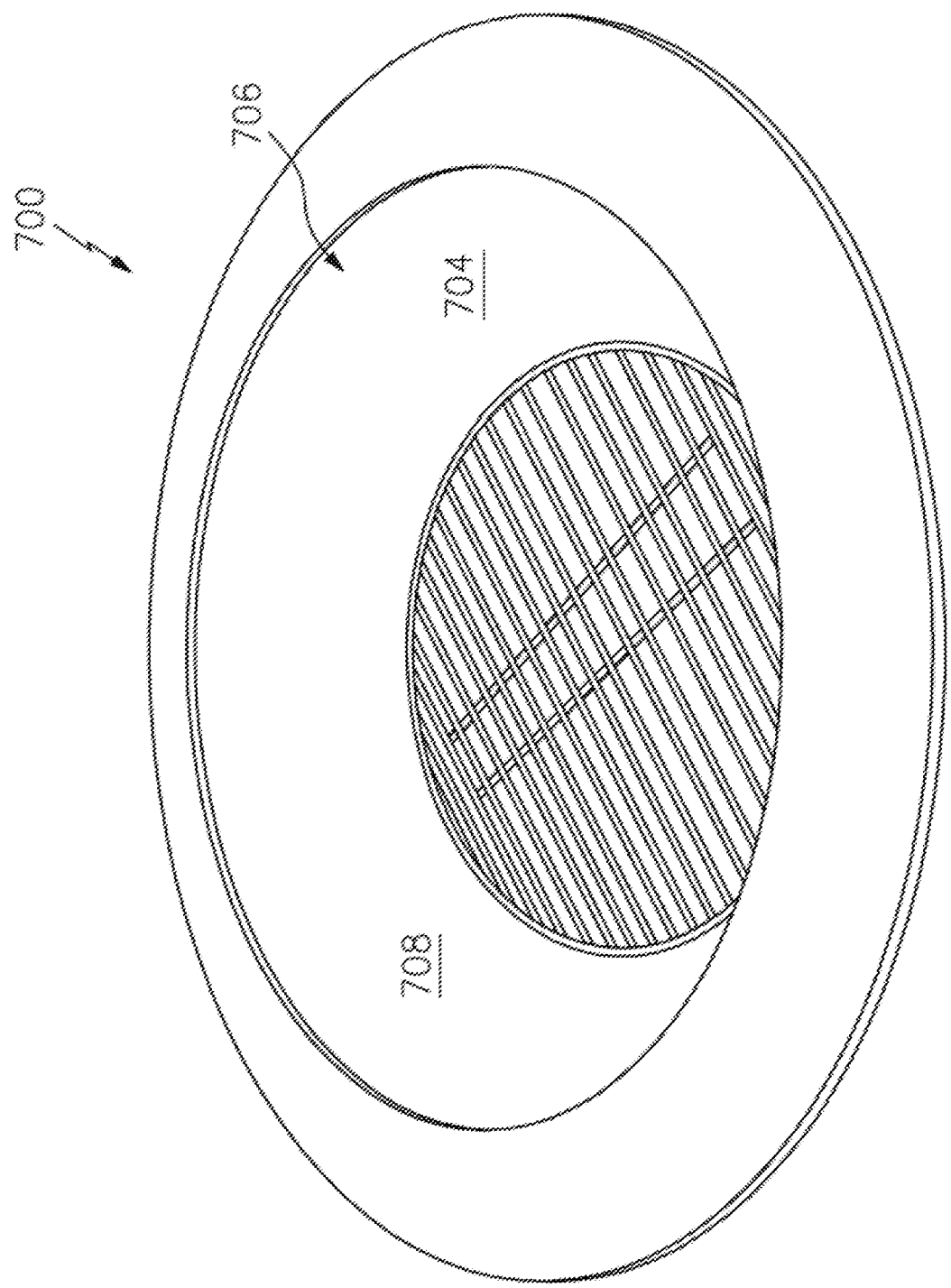
FIG. 36 is a top view of the smoking/cooking chamber of FIG. 35 with the cover removed.

It should be appreciated that the cooking/smoking chamber 102, 202 may be configured as a normal grill capable of holding grilling fuel (charcoal, wood, etc.), as shown in FIG. 34. In this configuration, the grill may hold the grill fuel (charcoal, wood, etc.) which may be ignited (and kept lit if desired) by the heating element 144, 244, when the heating element 144, 244 is in the configuration closest to the grill fuel.

Figure 37:
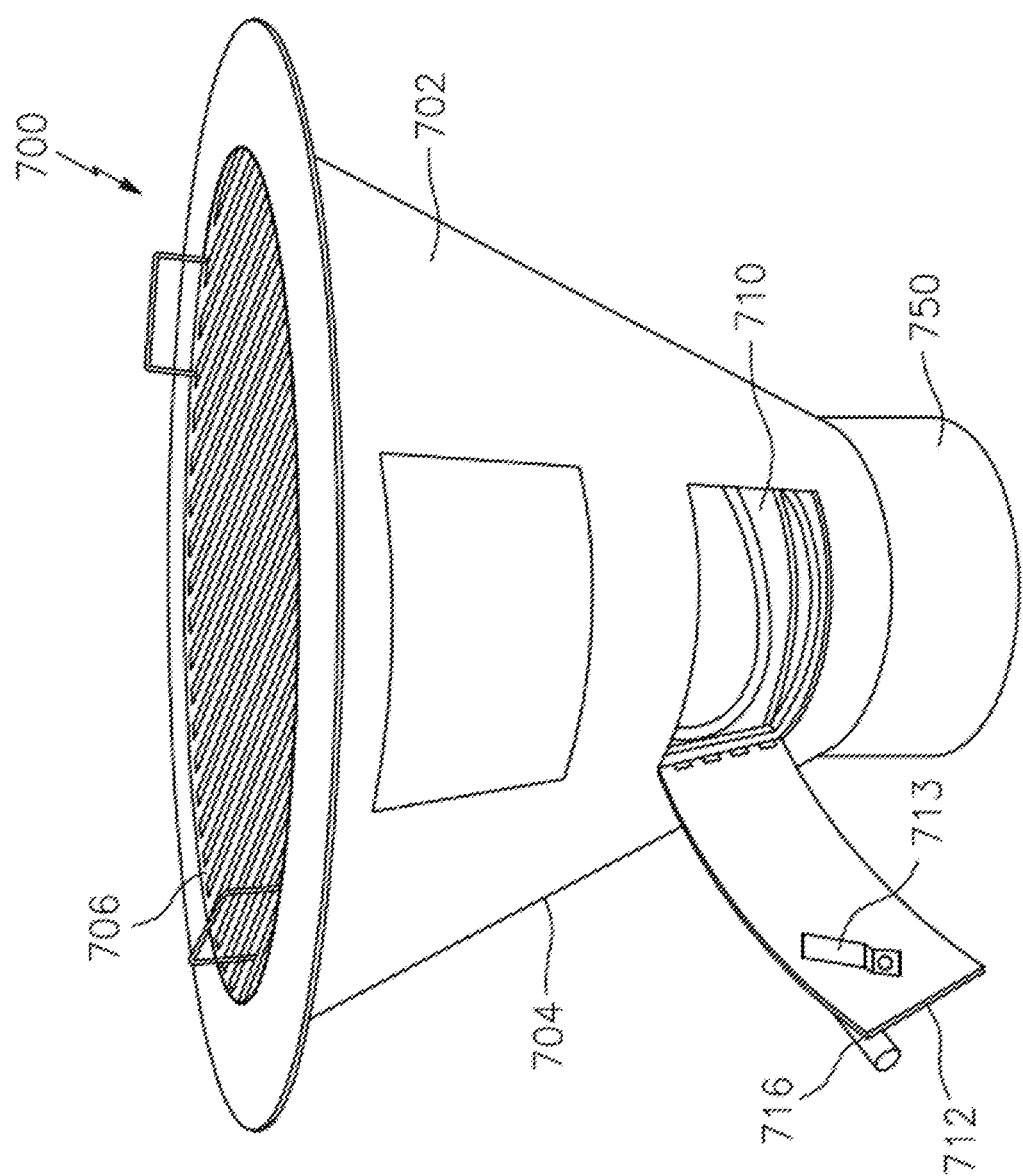
FIG. 37 is a side view of the smoking/cooking chamber of FIG. 35 with the cover removed showing the chamber side opening with the chamber access door in the second configuration.
Figure 38:
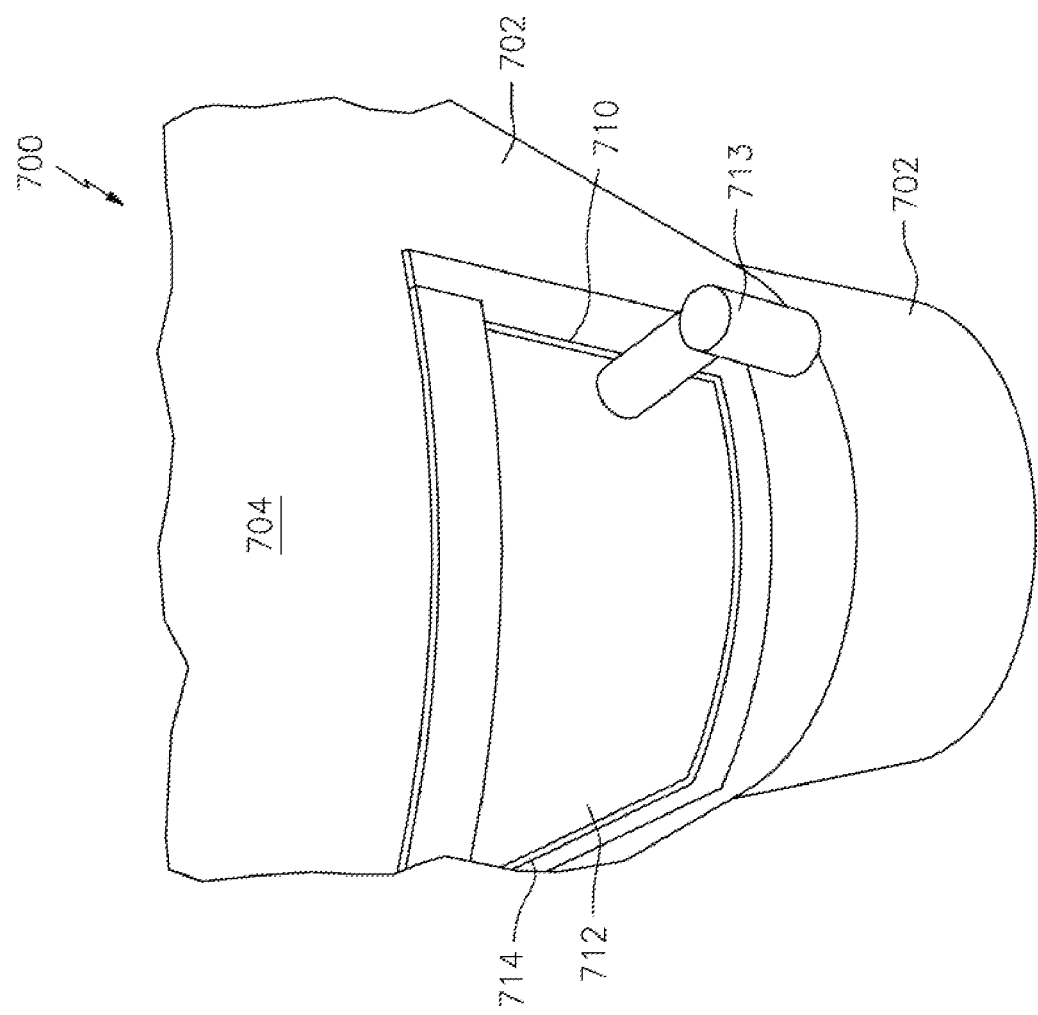
FIG. 38 is a side view of the smoking/cooking chamber of FIG. 35 with the cover removed showing the chamber side opening with the chamber access door in the first configuration.
Figure 39:
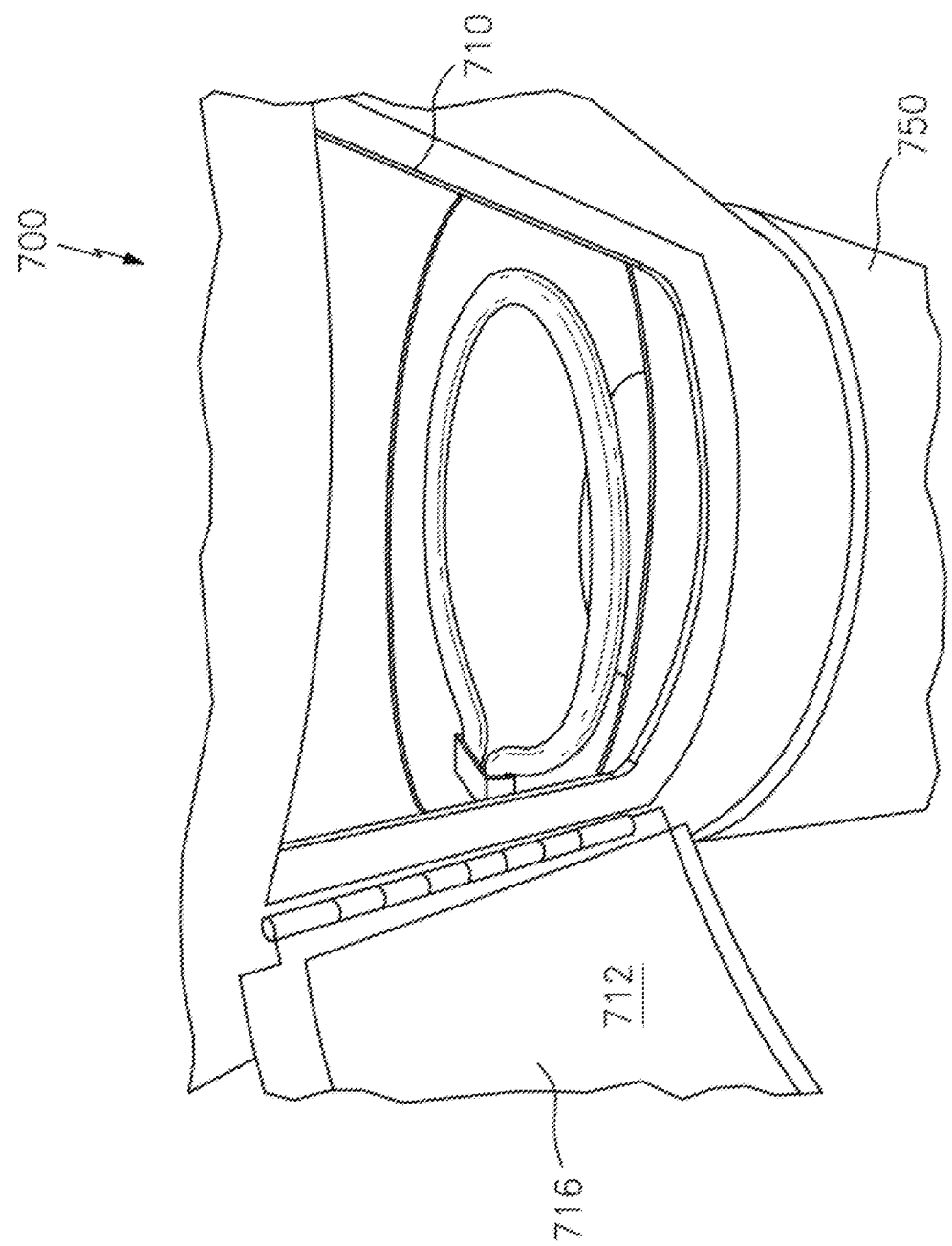
FIG. 39 is a side view of the smoking/cooking chamber of FIG. 35 with the cover removed showing the chamber side opening with the chamber access door in the second configuration.

Referring to FIG. 35-FIG. 42, it should be appreciated that in still yet another embodiment of a meat smoker/cooker device 700, a cooking/smoking chamber 702 having a heating element 703 that is stationary is provided and includes a chamber wall 704 defining a chamber upper opening 706 and a chamber cavity 708, wherein the chamber upper opening 706 allows access to the chamber cavity 708. Referring to FIG. 37, the chamber wall 704 defines a chamber side opening 710 which includes a chamber access door 712 which is configurable between a first configuration 714 and a second configuration 716. Referring to FIG. 38, when in the first configuration 714 the chamber access door 712 is located proximate the chamber side opening 710 to cover the chamber side opening 710 and thus limit access to the chamber cavity 708 via the chamber side opening 710. The chamber access door 712 may include a handle/securing mechanism 713 to secure the chamber access door 712 in the first configuration 714. Referring to FIG. 39, when in the second configuration 716 the chamber access door 712 is located away from the chamber side opening 710 to allow access to the chamber cavity 708 via the chamber side opening 710. Additionally, the cooking/smoking chamber 702 further defines a heating element side opening 717 to allow power to be connected to the heating element 703. It is contemplated that the cooking/smoking chamber 702 may also include a cover 719 to cover the chamber upper opening 706.

Figure 40:
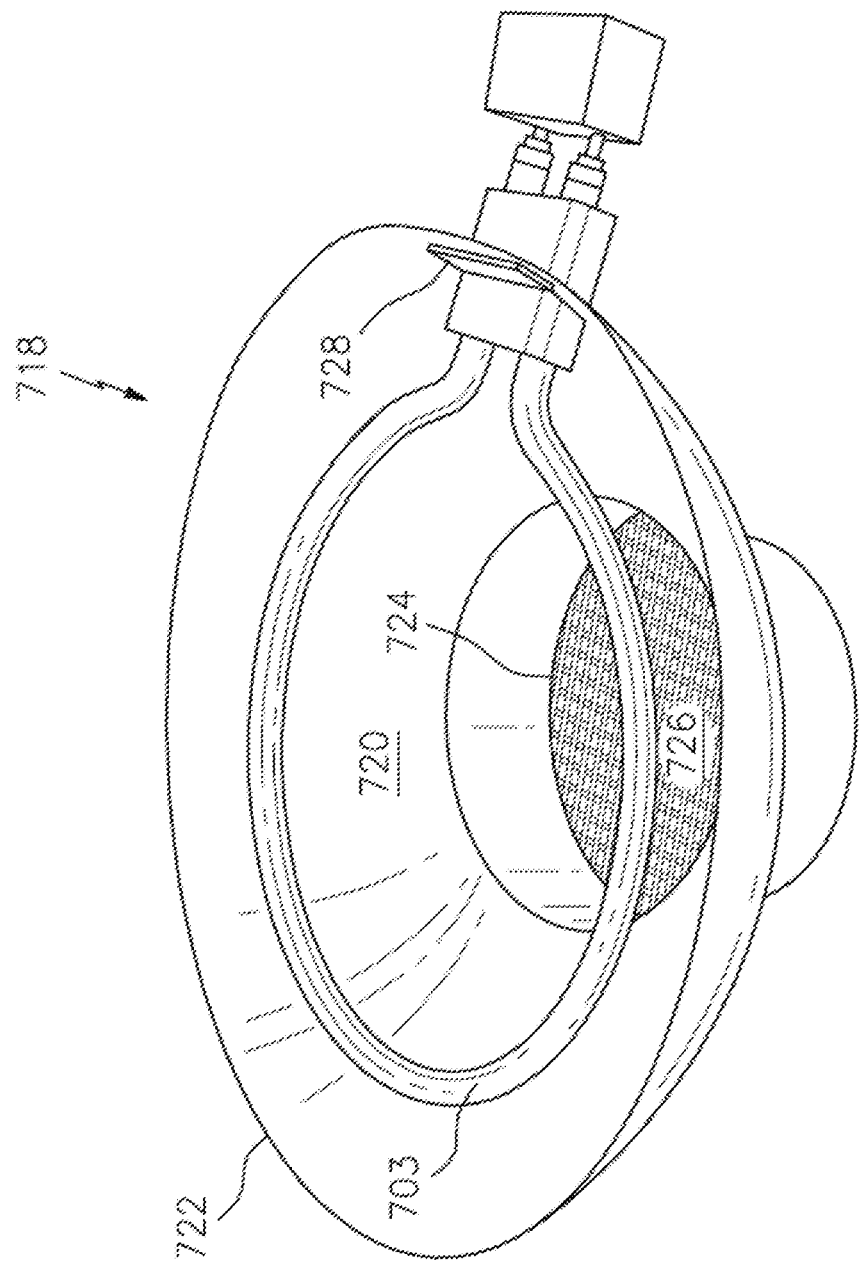
FIG. 40 is a top side view of the fuel support of the smoking/cooking chamber of FIG. 35 showing the heating element.
Figure 41:
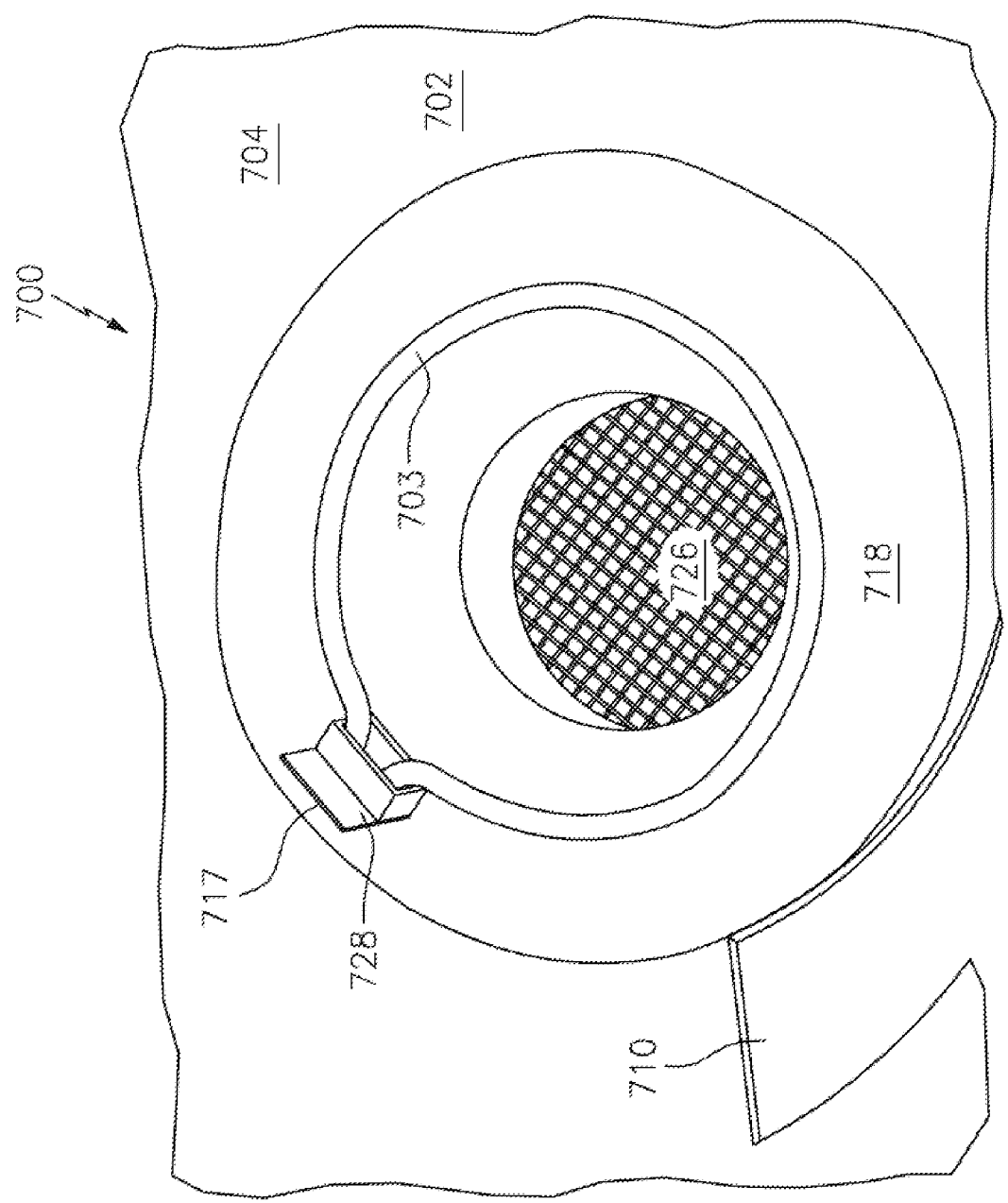
FIG. 41 is a top view of the fuel support of the smoking/cooking chamber of FIG. 35 located within the chamber cavity.

Referring to FIG. 40, the cooking/smoking chamber 702 further includes a fuel support 718 which includes a fuel support wall 720, a fuel support upper opening 722, a fuel support lower opening 724 and a fuel support screen 726, wherein the fuel support screen 726 is associated with the fuel support wall 720 to be located proximate to and cover the fuel support lower opening 724. The fuel support wall 720 further includes a fuel support heating element opening 728 which is configured to support the heating element 703 while allowing power to be connected to the heating element 703. Referring to FIG. 41, the cooking/smoking chamber 702 is configured such that the fuel support 718 is supported therein such that the fuel support heating element opening 728 and the heating element side opening 717 are aligned. As such, referring to FIG. 42, the heating element partially protrudes from the fuel support heating element opening 728 and the heating element side opening 717 to allow power to be connected to the heating element 703. It should be appreciated that the cooking/smoking chamber 702 further includes a lower portion 750 for catching ashes and spent fuel remnants.

Figure 42:
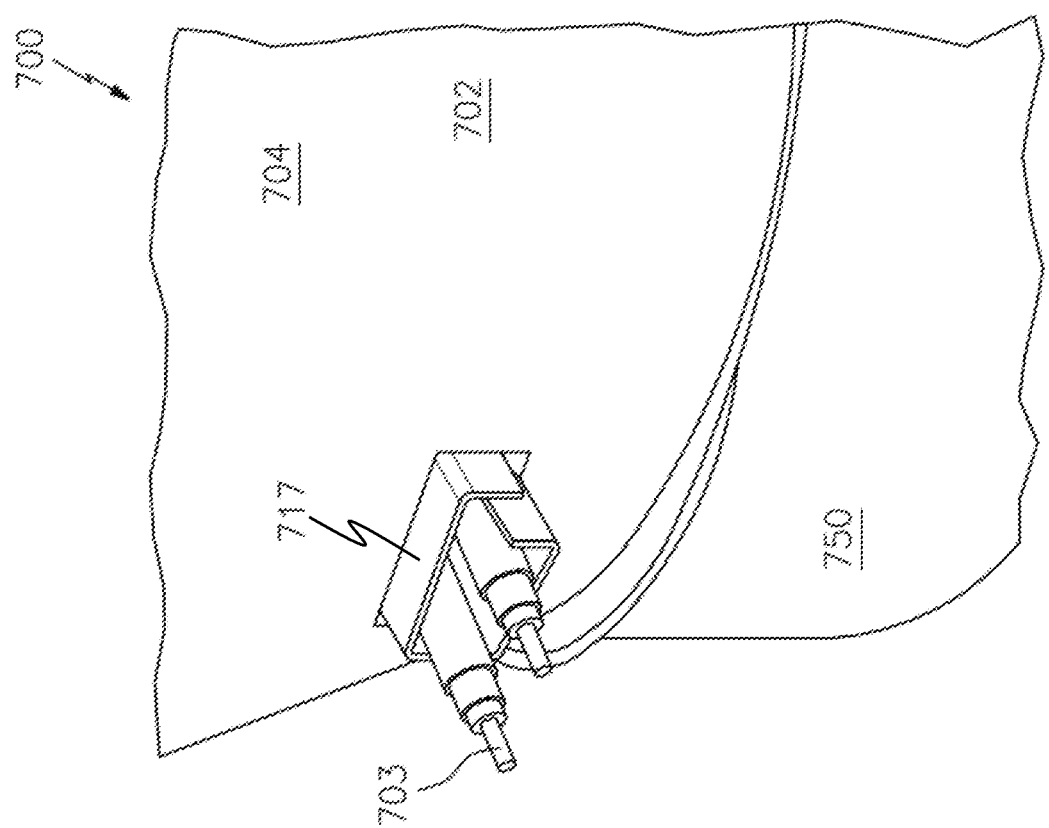
FIG. 42 is a side view of the smoking/cooking chamber showing the heating element protruding from the heating element side opening.
Figure 43:
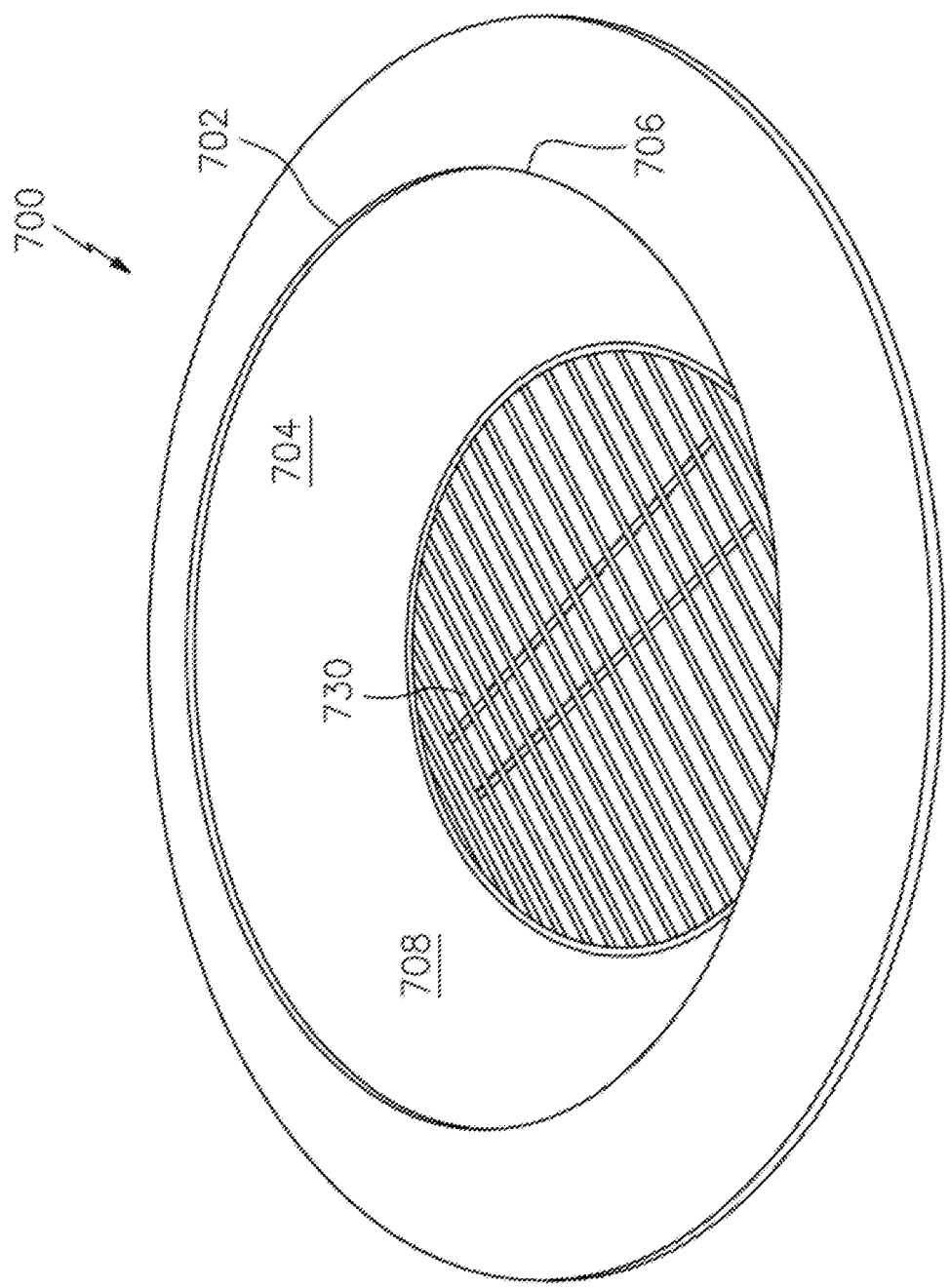
FIG. 43 is a top view of the smoking/cooking chamber of FIG. 35 with the cover removed.
Figure 45:
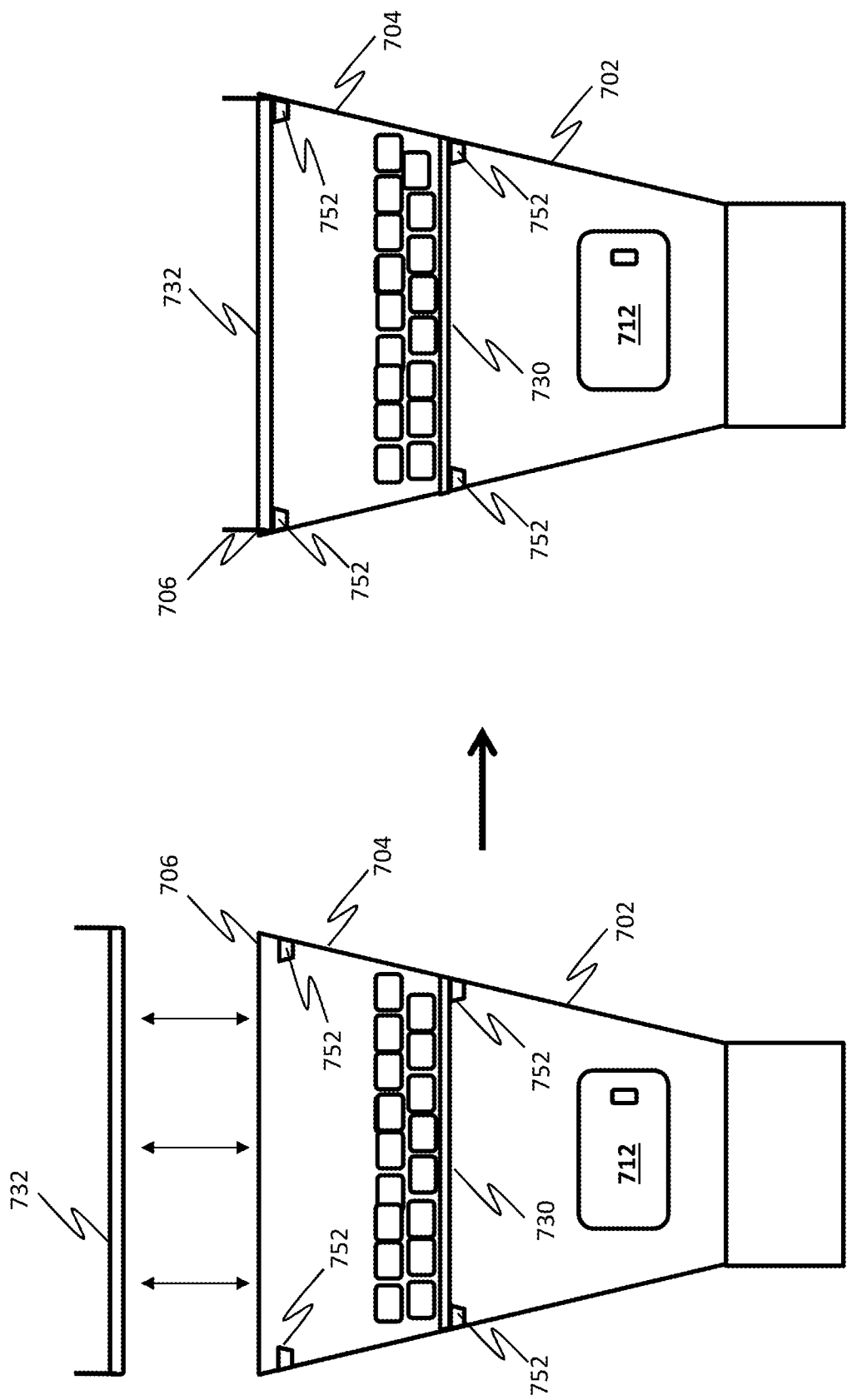
FIG. 45 is a side sectional view of the smoking/cooking chamber of FIG. 35, showing the grilling fuel grate and the food support structure, in accordance with another embodiment of the invention.
Figure 46:
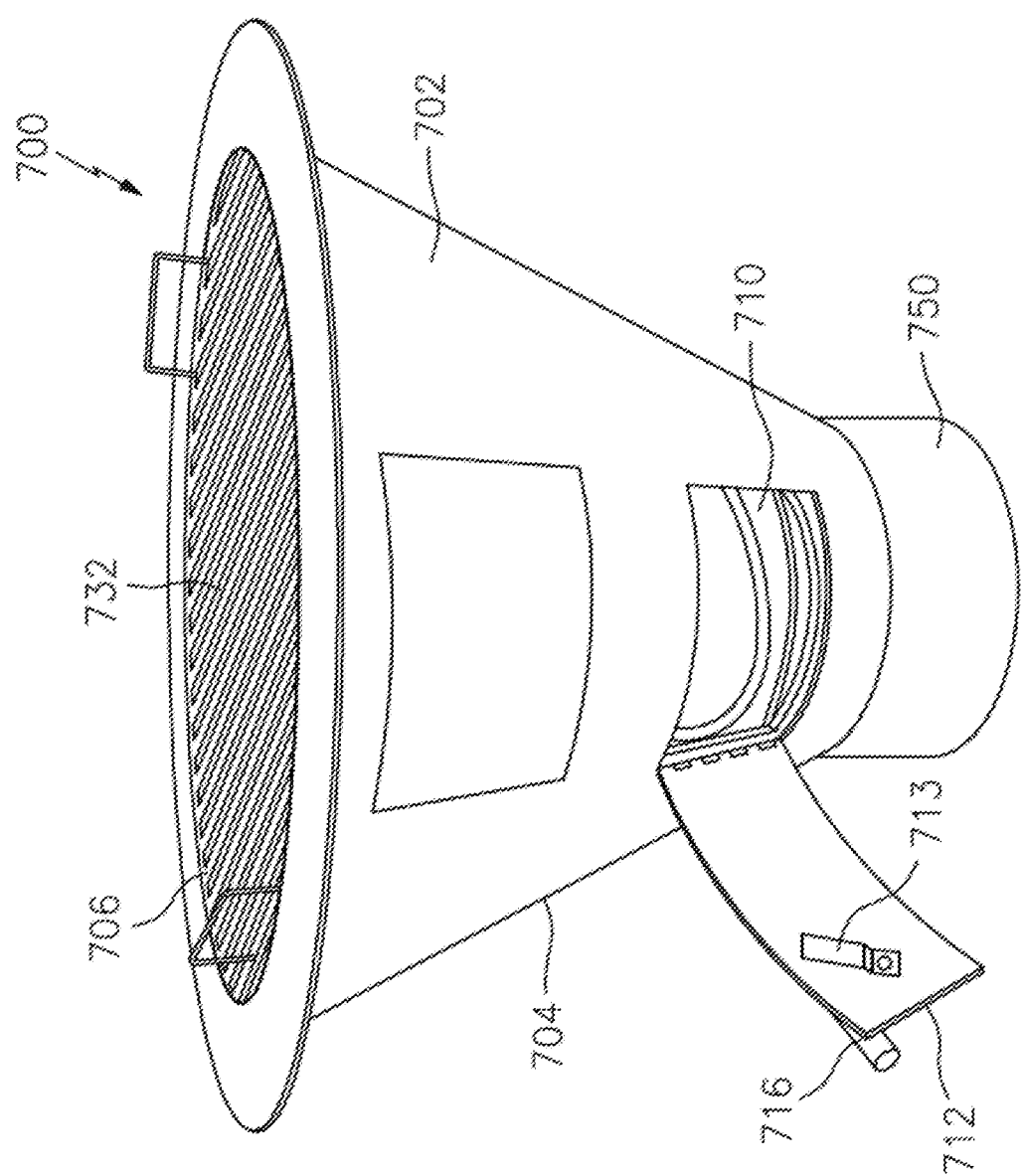
FIG. 46 is a side view of the smoking/cooking chamber of FIG. 35 with the food support structure associated with the smoking/cooking chamber.

Referring to FIG. 43, FIG. 44, FIG. 45 and FIG. 46, as discussed above the meat smoker/cooker device 700 may also be used as a grilling device. Referring to FIG. 43, the meat smoker/cooker device 700 further includes a grilling fuel grate 730 removably located within the cooking/smoking chamber 702, wherein the grilling fuel grate 730 is located above the fuel support 718. Referring to FIG. 44, it should be appreciated that in one embodiment, the chamber wall 704 may be angled such that the chamber cavity 708 may be funnel shaped. The grilling fuel grate 730 may then be located within the chamber cavity 708 to contact and rest on the chamber wall 704 as the chamber wall 704 narrows. Referring to FIG. 45, in another embodiment, the chamber wall 704 may include protruding structures 752 which may support the grilling fuel grate 730. The grilling fuel (such as charcoal or wood) is placed on the grilling fuel grate 730 and ignited. The meat smoker/cooker device 700 also includes a food support structure 732 which is associated with the meat smoker/cooker device 700 to be proximate to and cover the chamber upper opening 706. Referring to FIG. 44, it should be appreciated that in one embodiment, the food support structure 732 may then be located within the chamber cavity 708 (proximate the chamber upper opening 706) to contact and rest on the chamber wall 704 as the chamber wall 704 narrows. Referring to FIG. 42, in another embodiment, the chamber wall 704 may include protruding structures 752 which may support the food support structure 732. In still yet another embodiment, the food support structure 732 and/or grilling fuel grate 730 may be adjustable such that the space between the food support structure 732 and grilling fuel grate 730 is adjustable to allow the food to be placed closer to or farther from the heat source. This advantageously allows the meat smoker/cooker device 100, 200, 300, 700 to be used to cook, grill and/or smoke selected meats and other food items.

Also in accordance with the present invention, the processing of the method 400 in FIG. 33 may be implemented, wholly or partially, by a controller operating in response to a machine-readable computer program. In order to perform the prescribed functions and desired processing, as well as the computations therefore (e.g. execution control algorithm(s), the control processes prescribed herein, and the like), the controller may include, but not be limited to, a processor(s), computer(s), memory, storage, register(s), timing, interrupt(s), communication interface(s), and input/output signal interface(s), as well as combination comprising at least one of the foregoing.

Moreover, the method of the invention may also be embodied in the form of computer program code containing instructions embodied in tangible media, such as floppy diskettes, CD-ROMs, hard drives, and/or any other computer-readable medium, wherein when the computer program code is loaded into and executed by a computer or controller, the computer or controller becomes an apparatus for practicing the invention. The invention can also be embodied in the form of computer program code, for example, whether stored in a storage medium, loaded into and/or executed by a computer or controller, or transmitted over some transmission medium, such as over electrical wiring or cabling, through fiber optics, or via electromagnetic radiation, wherein when the computer program code is loaded into and executed by a computer or a controller, the computer or controller becomes an apparatus for practicing the invention. When implemented on a general-purpose microprocessor the computer program code segments may configure the microprocessor to create specific logic circuits.

It should be appreciated that while the invention has been described with reference to an exemplary embodiment, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A meat smoker/cooker device, comprising:
   a smoking/cooking chamber, wherein the smoking/cooking chamber includes a chamber structure which defines a chamber cavity and a chamber opening communicated with the chamber cavity;
   a chamber opening cover;
   a fuel chamber, wherein the fuel chamber includes a fuel chamber structure which includes a fuel chamber sidewall that defines a fuel chamber cavity, wherein the fuel chamber sidewall includes a first mounting hole, a second mounting hole and a sidewall slot communicated with the fuel chamber cavity, wherein the sidewall slot includes a slot top and a slot bottom, wherein the first mounting hole is located proximate the slot top and the second mounting hole is located proximate the slot bottom;

a fuel container having a container rim and a fuel support structure, wherein the fuel container is located within the fuel chamber cavity proximate the slot bottom; and an ignition article having an ignition article handle, an ignition article mounting structure and an electric heating element, wherein the electric heating element is at least partially located within the fuel chamber cavity and wherein the ignition article is movably associated with the fuel chamber and wherein the ignition article handle includes a handle portion configured to be vertically movable within the sidewall slot and wherein the ignition article mounting structure is configured to mountingly engage with the first and second mounting hole, wherein the ignition article is configurable between a first configuration and a second configuration within the fuel chamber cavity, wherein when in the first configuration, the heating element is located proximate the container rim and wherein when in the second configuration, the heating element is located remotely from the container rim.

2. The meat smoker/cooker device of claim 1, wherein the chamber opening cover is movably associated with the chamber structure to be configurable between an open configuration and a closed configuration.

3. The meat smoker/cooker device of claim 1, wherein when the ignition article is in the first configuration, the heating element is located proximate the container rim such that a fuel source is located proximate to or in contact with the heating element.

4. The meat smoker/cooker device of claim 3, wherein the ignition article is configurable between the first configuration and the second configuration via at least one of a manual means and an automatic means.

5. The meat smoker/cooker device of claim 1, wherein the smoking/cooking chamber includes a food support structure for supporting meat during the smoking and/or cooking process.

6. The meat smoker/cooker device of claim 1, wherein when the heating element is in the second configuration, the heating element is located proximate the food support structure.

7. The meat smoker/cooker device of claim 1, wherein when the heating element is in the first configuration, the heating element is located proximate the bottom of the fuel chamber.

8. The meat smoker/cooker device of claim 1, wherein the heating element is at least one of automatically and manually configurable to project varying degrees of heat.

9. The meat smoker/cooker device of claim 1, wherein the fuel support structure is basket shaped.

10. A meat smoker/cooker device, comprising:

a fuel chamber, wherein the fuel chamber includes a fuel chamber structure which includes a fuel chamber sidewall that defines a fuel chamber cavity, wherein the fuel chamber sidewall includes a first mounting hole, a second mounting hole and a sidewall slot communicated with the fuel chamber cavity, wherein the sidewall slot includes a slot top and a slot bottom, wherein the first mounting hole is located proximate the slot top and the second mounting hole is located proximate the slot bottom;

a fuel container having a container rim and a fuel support structure, wherein the fuel container is located within the fuel chamber cavity proximate the slot bottom; and an ignition article having an ignition article handle, an ignition article mounting structure and a heating element, wherein the ignition article handle includes a handle portion configured to be vertically movable within the sidewall slot and wherein the ignition article mounting structure is configured to mountingly engage with the first and second mounting hole, wherein the ignition article is configurable between a first configuration and a second configuration within the fuel chamber cavity, wherein when in the first configuration, the heating element is located proximate the container rim and wherein when in the second configuration, the heating element is located remotely from the container rim.

11. The meat smoker/cooker device of claim 10, further including a smoking/cooking chamber, wherein the smoking/cooking chamber includes a chamber structure which defines a chamber cavity and a chamber opening communicated with the chamber cavity, and a chamber opening cover.

12. The meat smoker/cooker device of claim 11, wherein the chamber opening cover is movably associated with the chamber structure to be configurable between an open configuration and a closed configuration.

13. The meat smoker/cooker device of claim 11, wherein the smoking/cooking chamber includes a food support structure for supporting meat during the smoking and/or cooking process.

14. The meat smoker/cooker device of claim 11, wherein when the heating element is in the second configuration, the heating element is located proximate the food support structure.

15. The meat smoker/cooker device of claim 10, wherein when the ignition article is in the first configuration, the heating element is located proximate the container rim such that a fuel source is located proximate to or in contact with the heating element.

16. The meat smoker/cooker device of claim 15, wherein the ignition article is configurable between the first configuration and the second configuration via at least one of a manual means and an automatic means.

17. The meat smoker/cooker device of claim 10, wherein when the heating element is in the first configuration, the heating element is located proximate the bottom of the fuel chamber.

18. The meat smoker/cooker device of claim 10, wherein the heating element is at least one of automatically and manually configurable to project varying degrees of heat.

19. The meat smoker/cooker device of claim 10, wherein the fuel support structure is basket shaped.

20. A method for operating a meat smoker/cooker device having a fuel chamber and an ignition article, the method comprising:

locating fuel within the fuel chamber;

configuring the ignition article into a first configuration such that the ignition article is located proximate the fuel, wherein configuring the ignition article into the first configuration includes vertically moving the ignition article into the first configuration;

operating the ignition article to cause the fuel to ignite and burn; and when the fuel is ignited and burning, configuring the ignition article into a second configuration such that the ignition article is located away from the ignited and burning fuel, wherein configuring the ignition article into the second configuration includes vertically moving the ignition article into the second configuration.

\* \* \* \* \*